(12) United States Patent
Yabe

(10) Patent No.: US 11,516,992 B2
(45) Date of Patent: Dec. 6, 2022

(54) SYSTEM, CLIENT TERMINAL, CONTROL METHOD FOR SYSTEM, AND STORAGE MEDIUM

(71) Applicant: CANON KABUSHIKI KAISHA, Tokyo (JP)

(72) Inventor: Kenta Yabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 16/983,519

(22) Filed: Aug. 3, 2020

(65) Prior Publication Data

US 2021/0037785 A1 Feb. 11, 2021

(30) Foreign Application Priority Data

Aug. 7, 2019 (JP) .............................. JP2019-145571

(51) Int. Cl.
| | |
|---|---|
| *G06N 20/00* | (2019.01) |
| *G06N 5/04* | (2006.01) |
| *A01K 11/00* | (2006.01) |
| *G06K 9/62* | (2022.01) |
| *A01K 29/00* | (2006.01) |
| *G06V 40/10* | (2022.01) |
| *H04N 5/247* | (2006.01) |

(52) U.S. Cl.
CPC ............ *A01K 11/008* (2013.01); *A01K 29/00* (2013.01); *G06K 9/6256* (2013.01); *G06N 5/04* (2013.01); *G06N 20/00* (2019.01); *G06V 40/10* (2022.01); *H04N 5/247* (2013.01)

(58) Field of Classification Search
None
See application file for complete search history.

(56) References Cited

U.S. PATENT DOCUMENTS

| | | | |
|---|---|---|---|
| 10,952,410 B2 * | 3/2021 | Dumm | .................... A61K 31/20 |
| 2019/0166801 A1 * | 6/2019 | Klein | ........................ G06T 7/62 |

FOREIGN PATENT DOCUMENTS

| | | |
|---|---|---|
| JP | 2016-59300 A | 4/2016 |
| WO | 2017/159109 A1 | 1/2019 |

* cited by examiner

*Primary Examiner* — Dov Popovici
(74) *Attorney, Agent, or Firm* — Canon U.S.A., Inc., IP Division

(57) ABSTRACT

An estimation apparatus includes an acquisition unit configured to acquire data about a domesticated animal identified by identification information that is transmitted by a client terminal, and an estimation unit configured to perform estimation by inputting the acquired data about a domesticated animal to a trained model generated by performing machine learning based on captured image data of domesticated animals and collected data about domesticated animals and provide, to the client terminal, an estimation result indicating a result of the estimation, and the client terminal includes a presenting unit configured to transmit a request for estimation together with identification information for identifying a domesticated animal targeted for estimation, receive the estimation result, and present body weight data about the domesticated animal targeted for estimation to a user.

11 Claims, 12 Drawing Sheets

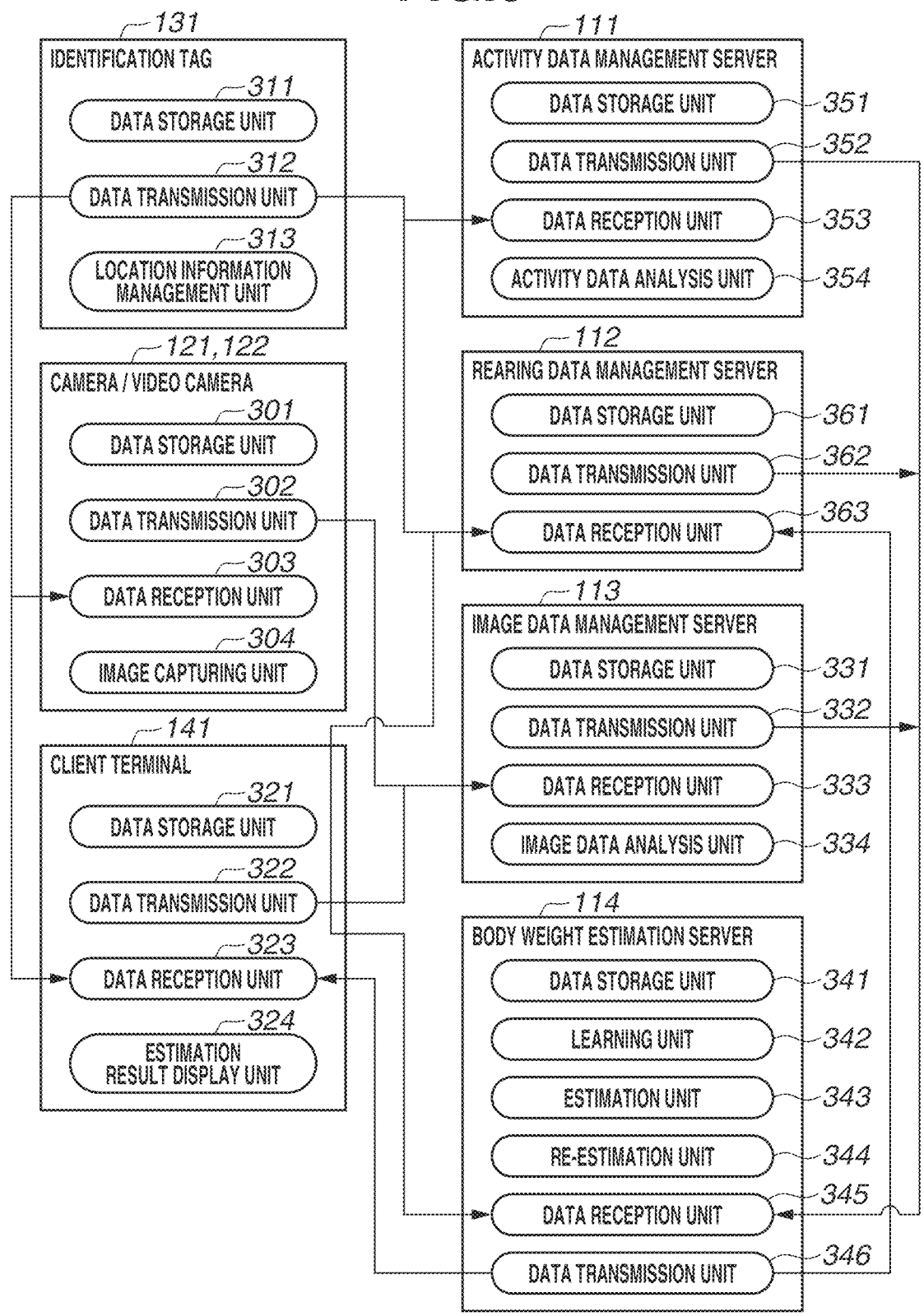

LEARNING MODEL FOR USE IN ESTIMATION UNIT 343

LEARNING MODEL FOR USE IN RE-ESTIMATION UNIT 344

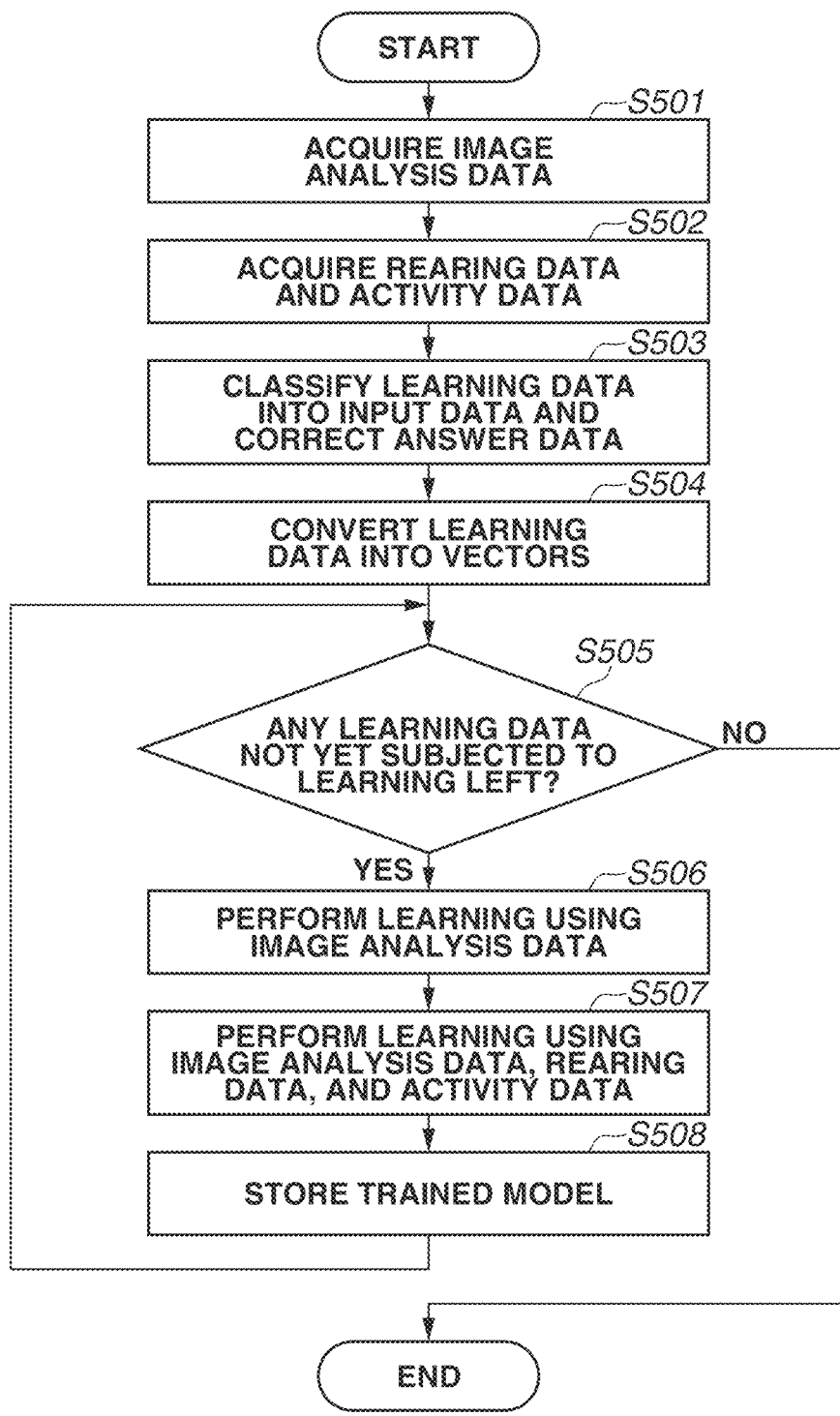

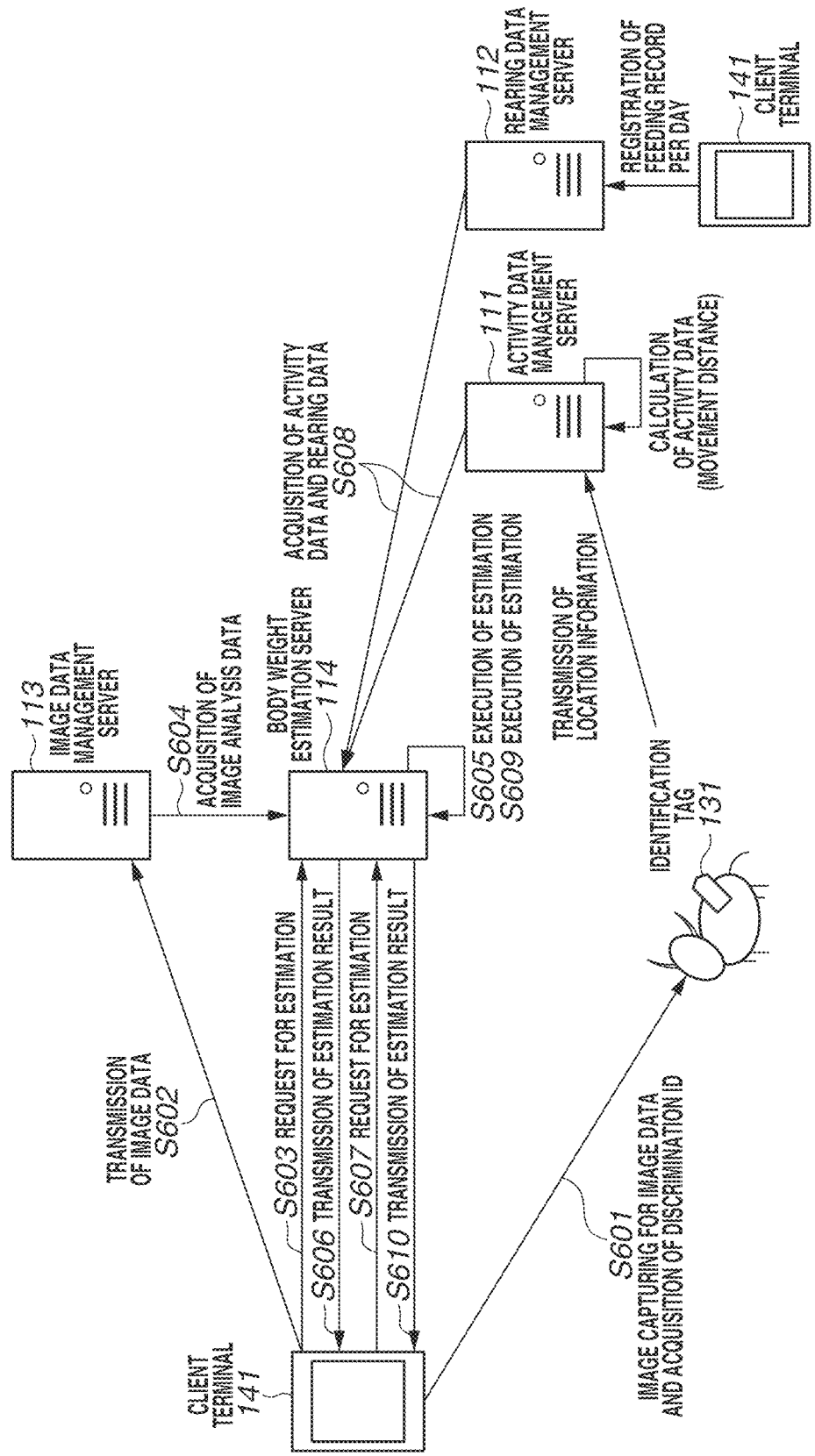

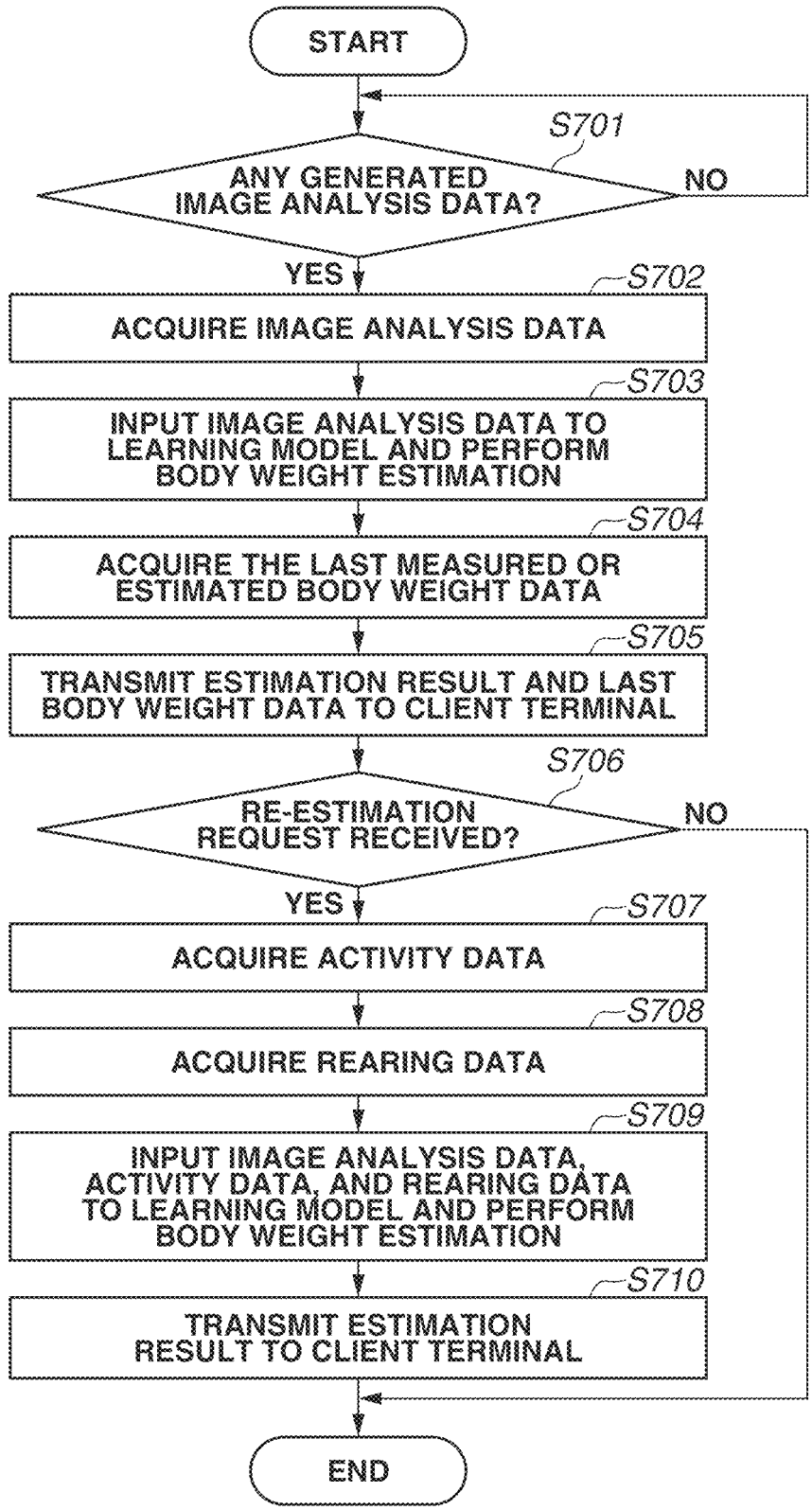

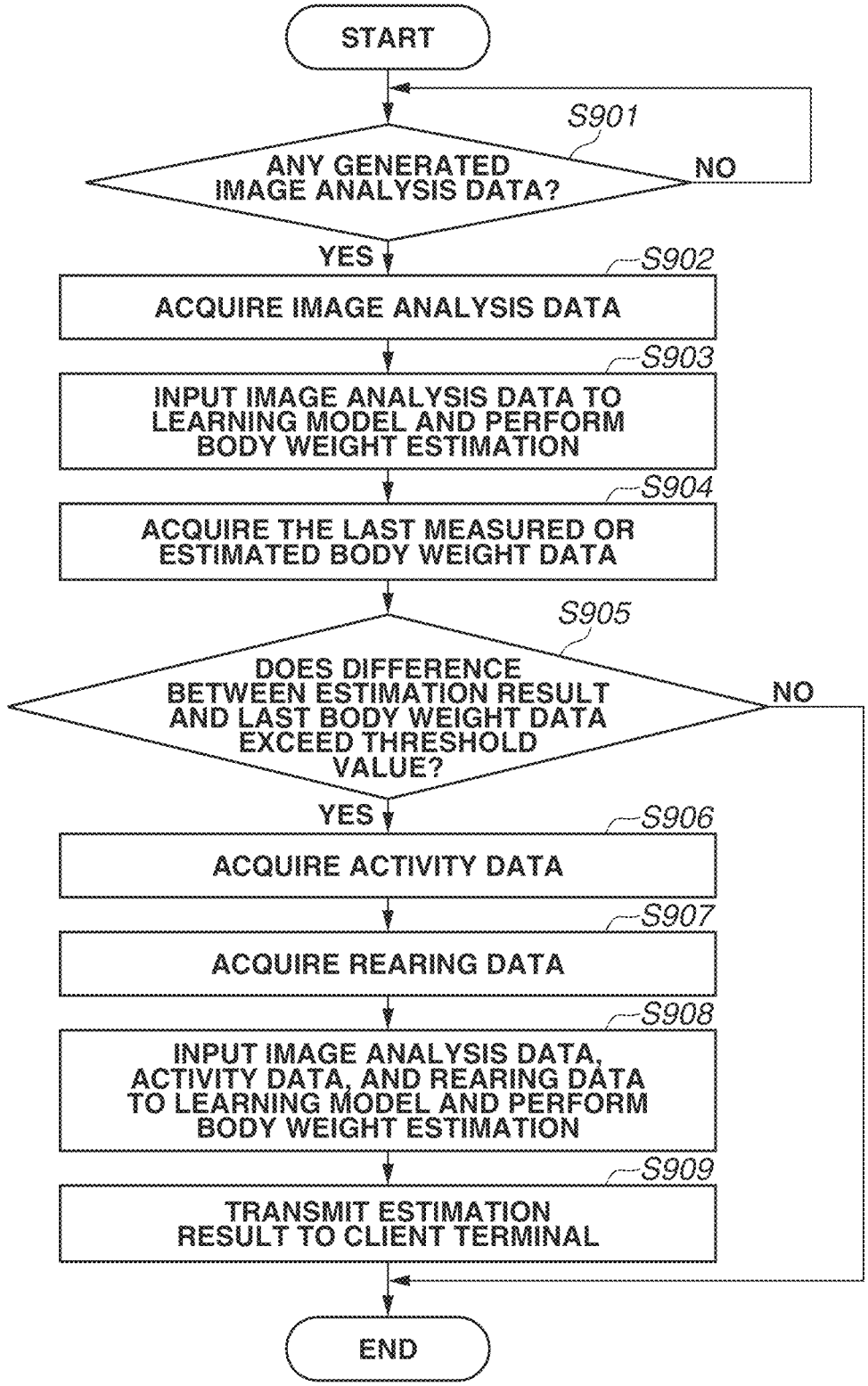

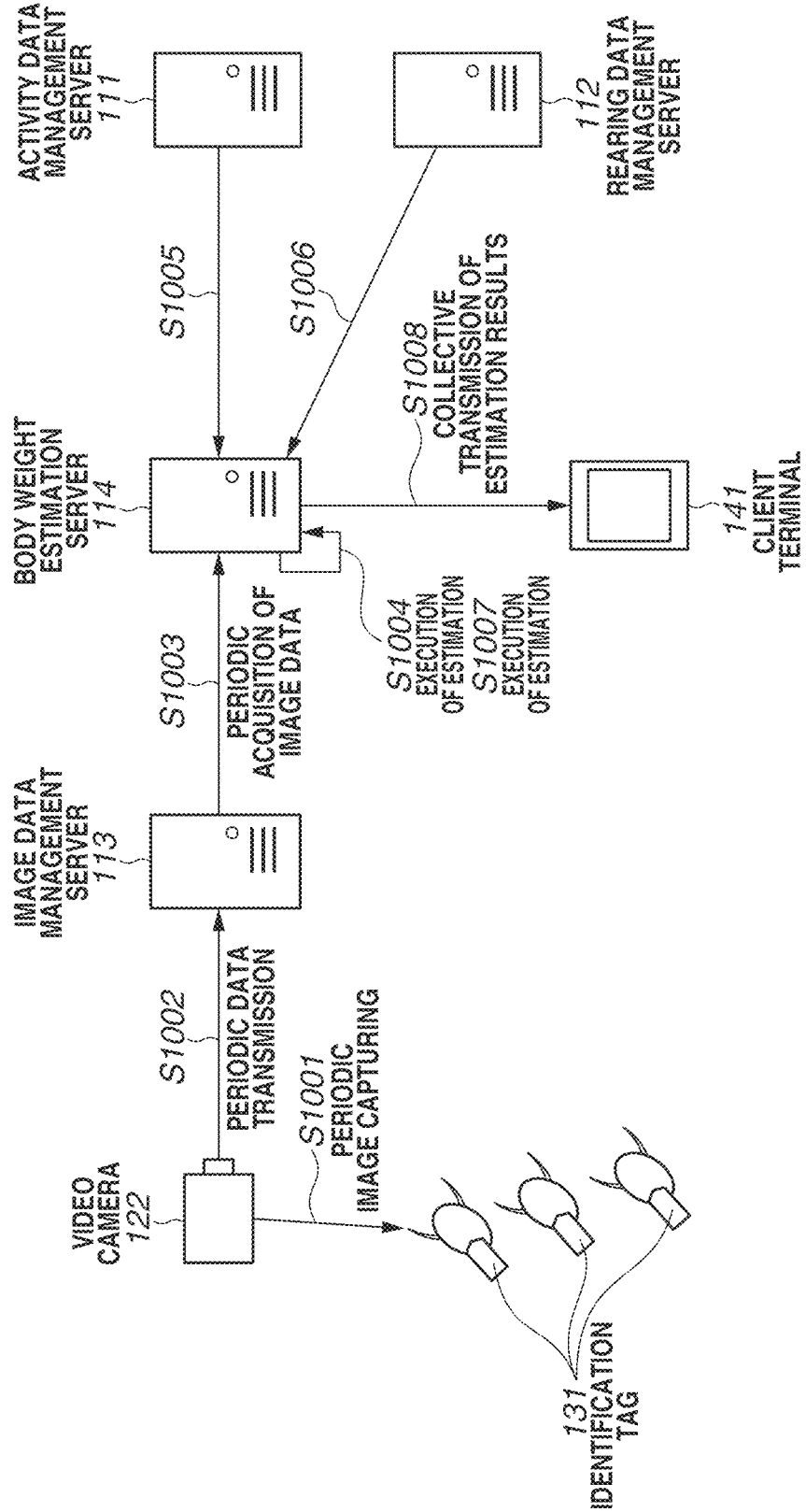

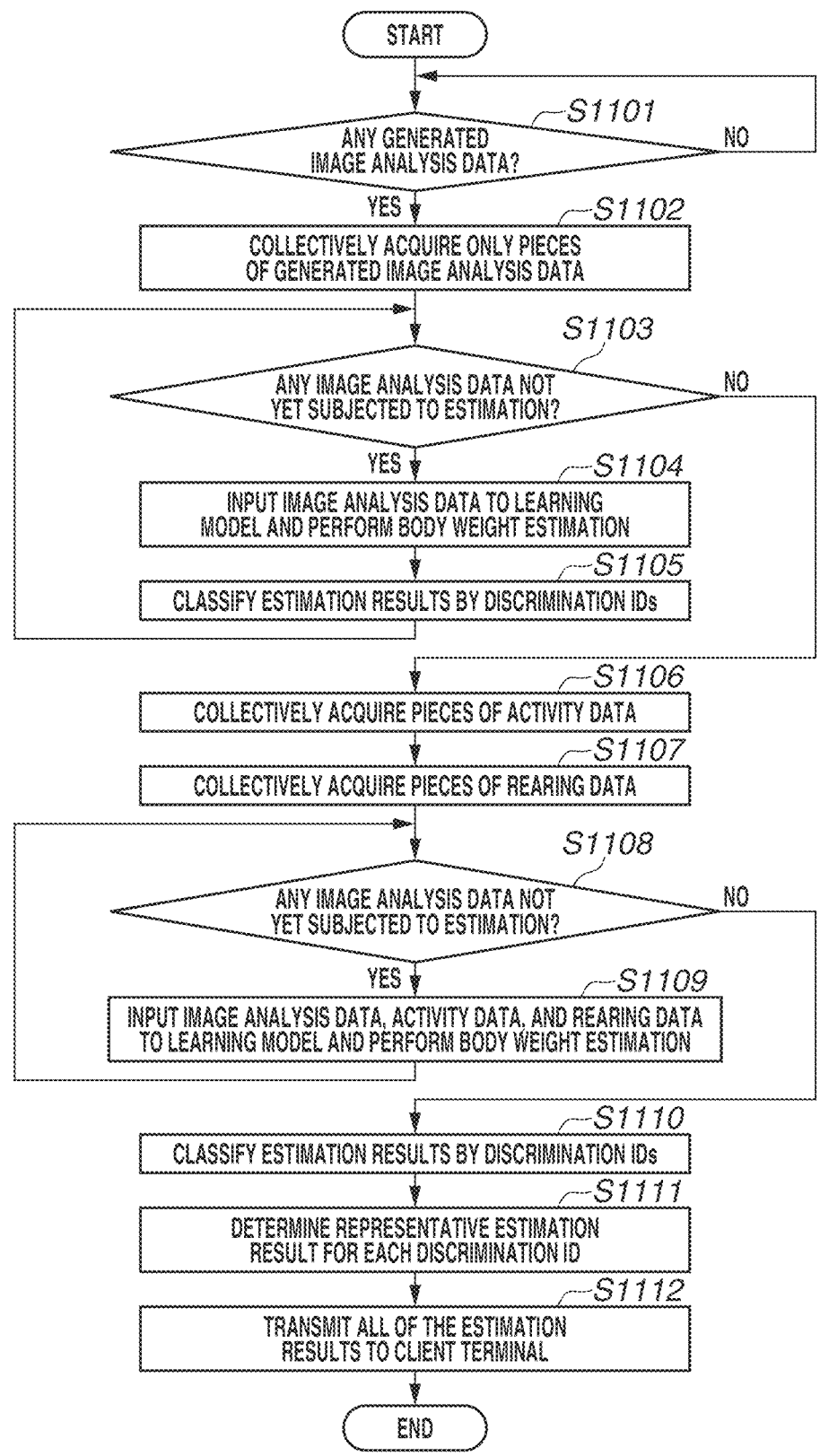

SYSTEM, CLIENT TERMINAL, CONTROL METHOD FOR SYSTEM, AND STORAGE MEDIUM

BACKGROUND

Field

Aspects of the present disclosure generally relate to a system, a client terminal, a control method for the system, and a storage medium each of which performs body weight estimation in livestock (domesticated animals).

Description of the Related Art

Healthcare management in livestock is work directly and closely related to the quality of products for livestock farmers. For example, in Japan, in the case of cattle, even contracting a disease once causes a decrease in meat quality grade. Moreover, in the case of pigs, unless the body weight at the time of shipment of products falls within a prescribed range, the meat quality grade will be lowered even if other factors are good. While criteria for defining the quality of livestock as products differ according to countries, the influence of the health condition of livestock on qualities is significant regardless of countries, and healthcare management in livestock is currently of major concern to livestock farmers.

Examples of significant indicators for measuring the health condition of livestock include body weight. With regard to livestock farmers that usually farm a great number of individual domesticated animals, the work of getting domesticated animals onto a weight scale on an animal-by-animal basis to measure the body weight thereof is difficult work and requires a substantial amount of time. Livestock farmers perform a number of jobs on a daily basis including, in addition to measurement of body weight, jobs closely involved in the health condition of livestock, such as feeding the livestock and cleaning of livestock facilities. Measuring the body weight of livestock on a daily basis can impose a tremendous burden on livestock farmers.

Japanese Patent Application Laid-Open No. 2016-59300 discusses a method of estimating the objective body weight of an animal, without directly touching the animal, by statistically analyzing the body surface of the animal based on a three-dimensional image of the animal captured with use of a three-dimensional scanner apparatus.

SUMMARY OF THE INVENTION

According to an aspect of the present disclosure, a system includes an estimation apparatus that performs estimation using a trained model and a client terminal that transmits a request for estimation to the estimation apparatus, wherein the client terminal includes at least one first processer and at least one first memory coupled to the first processor and having stored thereon instructions, when executed by the first processor, and cooperating to act as a presenting unit configured to transmit a request for estimation together with identification information for identifying a domesticated animal targeted for estimation, receive the estimation result, and present body weight data about the domesticated animal targeted for estimation to a user, and wherein the estimation apparatus includes at least one first processer and at least one first memory coupled to the first processor and having stored thereon instructions, when executed by the first processor, and cooperating to act as an acquisition unit configured to acquire data about a domesticated animal identified by identification information that is transmitted by the client terminal, and an estimation unit configured to perform estimation by inputting the acquired data about a domesticated animal to a trained model generated by performing machine learning based on captured image data of domesticated animals and collected data about domesticated animals and provide, to the client terminal, an estimation result indicating a result of the estimation.

Further features will become apparent from the following description of exemplary embodiments with reference to the attached drawings.

BRIEF DESCRIPTION OF THE DRAWINGS

FIG. 3 is a diagram illustrating examples of software configurations of respective constituent elements of the livestock body weight estimation system according to the first exemplary embodiment.

FIG. 5 is a flowchart illustrating a series of processing operations that a learning unit performs to generate a learning model.

FIG. 6 is a diagram illustrating an operation sequence of the body weight estimation system using the learning models illustrated in FIGS. 4A and 4B.

FIG. 7 is a flowchart illustrating the details of body weight estimation processing that a body weight estimation server performs in the first exemplary embodiment.

FIG. 9 is a flowchart illustrating the details of body weight estimation processing that the body weight estimation server performs in a second exemplary embodiment of the invention.

FIG. 10 is a diagram illustrating an operation sequence of the body weight estimation system in a third exemplary embodiment of the invention.

FIG. 11 is a flowchart illustrating the details of body weight estimation processing that the body weight estimation server performs in the third exemplary embodiment.

DESCRIPTION OF THE EMBODIMENTS

Muscle and fat typically differ in density. Therefore, even if the sizes of body surfaces of animals are the same, there is an individual difference in the meat quality inside the body surfaces, which affects the accuracy of a body weight to be estimated. There are other factors that are not discriminable by using body surface images of animals, such as bone and blood. Japanese Patent Application Laid-Open No. 2016-59300 is not seen to discuss taking into account the influence of such factors that are not recognizable from body surfaces.

Various exemplary embodiments, features, and aspects will be described in detail below with reference to the drawings.

Figure 1:
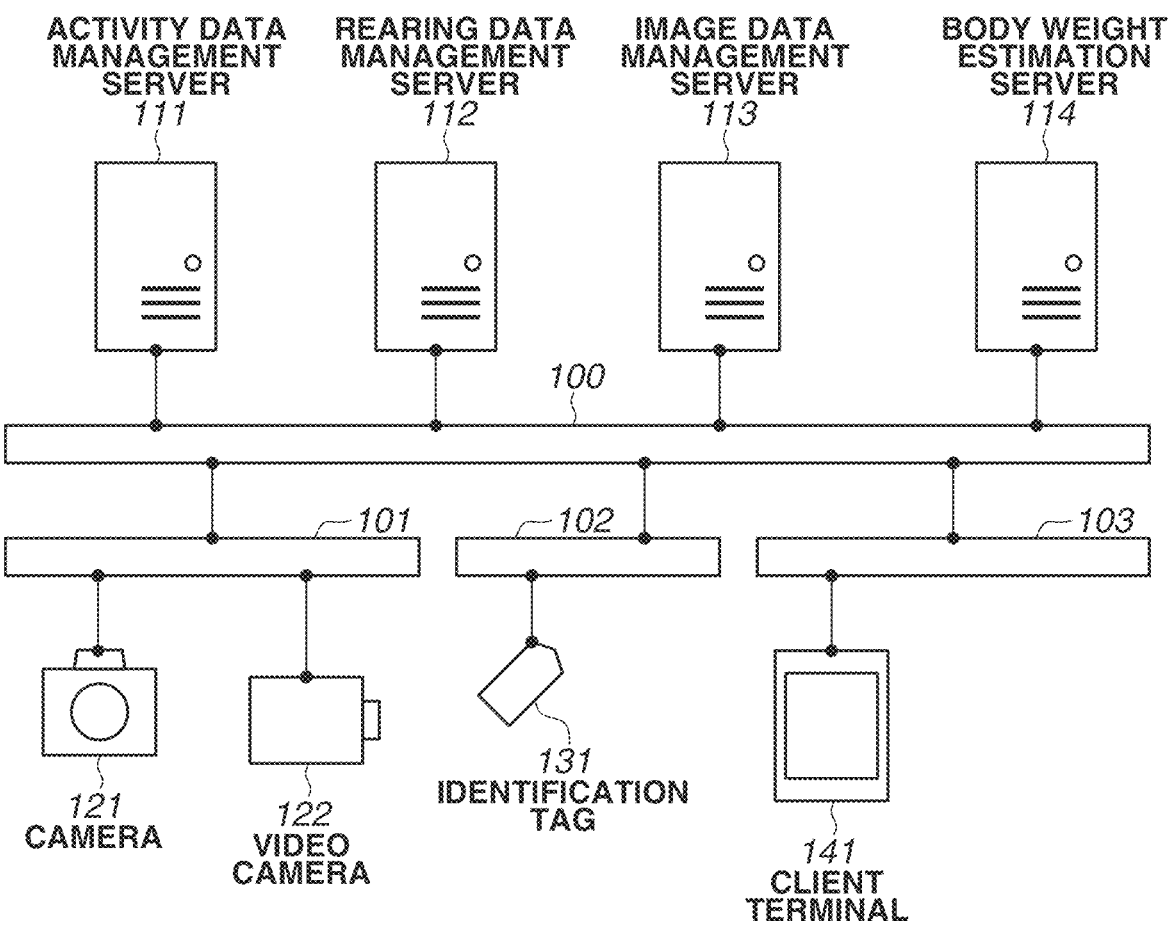
FIG. 1 is a diagram illustrating the entire configuration of a livestock body weight estimation system according to a first exemplary embodiment.

FIG. 1 is a diagram illustrating the entire configuration of a livestock body weight estimation system according to a first exemplary embodiment of the invention. Referring to FIG. 1, servers 111 to 114, cameras 121 and 122, an identification tag 131, and a client terminal 141 are interconnected via networks 100 to 103. Each of the networks 100 to 103 is implemented by, for example, the Internet, a local area network (LAN), a wide area network (WAN), a dedicated digital circuit line, an Asynchronous Transfer Mode (ATM) or Frame Relay circuit line, a cable television circuit line, or a data broadcasting wireless circuit line. The networks 100 to 103 do not have restrictions on types thereof as long as they are capable of allowing transmission and reception of data. In the present exemplary embodiment, the network 100 is assumed to be the Internet, and the networks 101, 102, and 103 are assumed to be local area networks.

The camera 121 has a network connection function and transmits captured image data to the image data management server 113. The video camera 122 has a network connection function and transmits captured video data to the image data management server 113. Furthermore, the present constituent elements can be apparatuses other than cameras as long as they have hardware and software capable of capturing image data or video data. For example, a client terminal having a camera function such as a smartphone can be employed. Moreover, even if not having a network connection function, a camera 121 or video camera 122 capable of transmitting image data or video data to the image data management server 113 via the client terminal 141 can be employed in the livestock body weight estimation system.

The identification tag 131 is a device that retains tag information available to identify a domesticated animal with the identification tag 131 attached thereto according to a technique such as radio-frequency identification (RFID) and is able to transmit the tag information as individual discrimination data. Moreover, the identification tag 131 is able to acquire location information about a target with the identification tag 131 attached thereto according to a technique such as the Global Positioning System (GPS) and transmit the acquired location information to the activity data management server 111.

The client terminal 141 is an information apparatus having a program execution environment incorporated therein. For example, the client terminal 141 is a desktop personal computer, a notebook personal computer, a personal digital assistant (PDA), or a smartphone. The client terminal 141 has an environment incorporate therein in which programs such as a web browser (for example, an Internet browser, a World Wide Web (WWW) browser, or software supplied for use of the World Wide Web) are executed.

The activity data management server 111 is a server that receives tag information and location information about a domesticated animal received from the identification tag 131 and stores and manages the tag information and location information in association with each other. The activity data management server 111 generates activity data, such as a movement distance and movement route, from pieces of location information about each domesticated animal received from the identification tag 131, and supplies the generated activity data to the body weight estimation server 114 and the client terminal 141. Furthermore, a procedure for generating activity data from the location information received by the activity data management server 111 has no direct relevance to the content of the present exemplary embodiment and is, therefore, omitted from description.

The rearing data management server 112 is a server that receives, from the client terminal 141, for example, information about, for example, the amount of feed given to a domesticated animal and weather information such as daily temperature and humidity, and stores and manages the received respective pieces of information in association with the tag information about a domesticated animal received from the identification tag 131. Moreover, the rearing data management server 112 is a server that receives estimated body weight data about a domesticated animal from the body weight estimation server 114 and actually measured body weight data about a domesticated animal from the client terminal 141, and stores and manages the received respective pieces of body weight data in association with the tag information.

The image data management server 113 is a server that stores and manages image data and video data received from the camera 121, the video camera 122, or the client terminal 141 in association with tag information received from the identification tag 131.

The body weight estimation server 114 is a server which has the function of estimating the body weight of a domesticated animal based on image data received from the image data management server 113, activity data received from the activity data management server 111, and rearing data received from the rearing data management server 112. The body weight estimation server 114 transmits body weight data that is a result of the estimation to the rearing data management server 112 and the client terminal 141.

While, in FIG. 1, for ease of explanation in the first exemplary embodiment, each of the servers 111 to 114 is illustrated as a single server, the number of servers is not intended to be limited. Each server can be configured with a plurality of physical server computers, a plurality of virtual server computers, or a plurality of physical and virtual server computers.

Figure 2A:
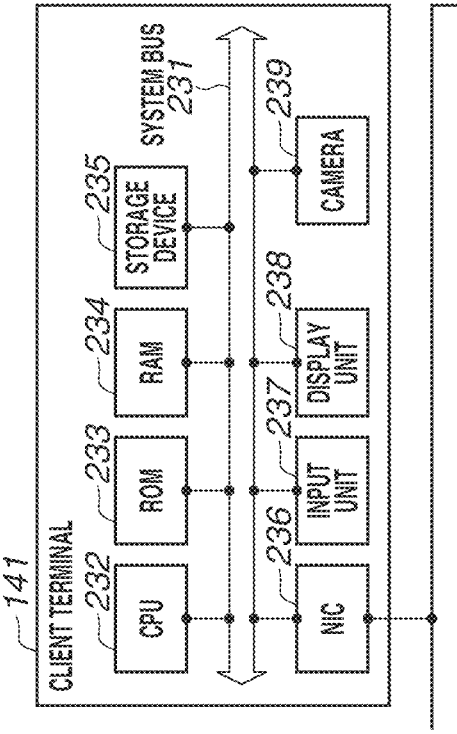
FIGS. 2A, 2B, 2C, and 2D are diagrams illustrating examples of hardware configurations of respective constituent elements of the livestock body weight estimation system according to the first exemplary embodiment.

FIGS. 2A, 2B, 2C, and 2D are diagrams illustrating examples of hardware configurations of respective constituent elements of the livestock body weight estimation system according to the first exemplary embodiment. FIG. 2A is a diagram illustrating an example of a server computer hardware configuration of each of the servers 111 to 114. A system bus 201 interconnects the respective constituent elements of each server.

A central processing unit (CPU) 202, which controls the entire server, comprehensively controls access of each constituent element connected to the system bus 201.

A read-only memory (ROM) 203, which is a storage unit, stores various pieces of data such as a basic input-output (I/O) program therein. A random access memory (RAM) 204, which is a temporary storage unit, functions as, for example, a main memory and a work area for the CPU 202 or a graphics processing unit (GPU) 209. A storage device 205, which is an external storage unit, functions as a large-capacity memory and stores, for example, programs associated with the present exemplary embodiment. The storage device 205 is, for example, a hard disk drive (HDD).

A network interface card (NIC) 206 is used to exchange data between each server and the respective constituent elements illustrated in FIG. 1 via the network 100. An input unit 207 is an instruction input unit that receives an instruction via an input device such as a keyboard (not illustrated) or a mouse (not illustrated). A display unit 208 performs displaying via an output device such as a display (not illustrated). The graphics processing unit (GPU) 209 performs processing to perform learning a plurality of times with use of a learning model such as deep learning. Using the GPU 209 enables performing parallel processing of a greater amount of data, thus attaining efficient computation.

Furthermore, the above-mentioned configuration of each server computer is merely an example and is not limited to a combination of elements illustrated in FIG. 2A. For example, the storage location for data or programs can be changed to any one of the ROM 203, the RAM 204, and the storage device 205 depending on its characteristics.

Figure 2D:
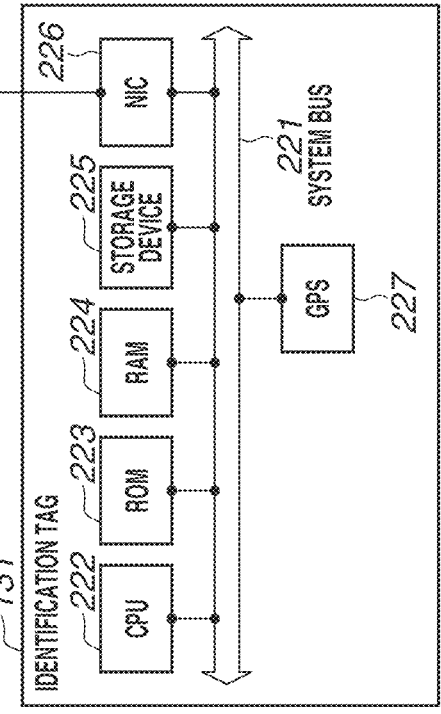
Figure 2B:
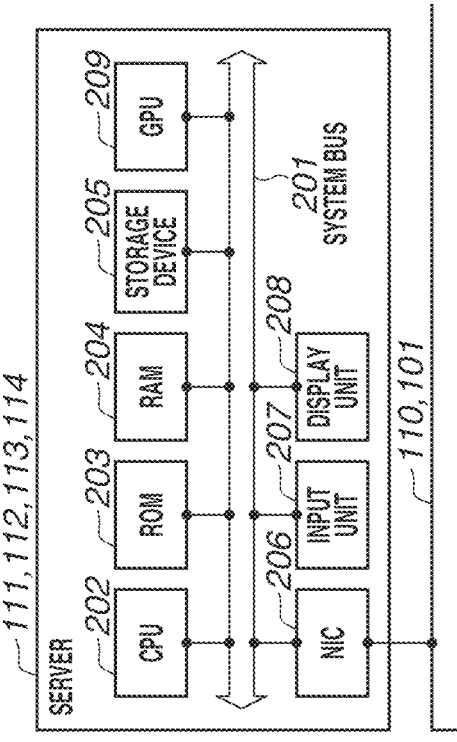

FIG. 2B is a diagram illustrating an example of a hardware configuration of each of the camera 121 and the video camera 122. A system bus 211 interconnects the respective constituent elements of each camera. A central processing unit (CPU) 212, which controls the entire camera, comprehensively controls access of each constituent element connected to the system bus 211.

A read-only memory (ROM) 213, which is a storage unit, stores various pieces of data such as a basic input-output (I/O) program therein. A random access memory (RAM) 214, which is a temporary storage unit, functions as, for example, a main memory and a work area for the CPU 212.

A storage device 215, which is an external storage unit, functions as a large-capacity memory and stores, for example, programs associated with the present exemplary embodiment and image data and video data read by an image sensor 220. The storage device 215 is, for example, a hard disk drive (HDD) or a Secure Digital (SD) memory card.

A network interface card (NIC) 216 is used to exchange data between each camera and the respective constituent elements illustrated in FIG. 1 via the network 101. An input unit 217 is an instruction input unit that receives an instruction via an input device such as hardware buttons (not illustrated). A display unit 218 performs displaying via an output device such as a display (not illustrated).

A lens 219 is used to capture an image and a video image. Image data and video data are able to be acquired by image capturing that causes the image sensor 220 to read light input via the lens 219 and stores a result of such reading in the storage device 215.

Furthermore, the above-mentioned configuration of each camera is merely an example and is not limited to a combination of elements illustrated in FIG. 2B. For example, the storage location for data or programs can be changed to any one of the ROM 213, the RAM 214, and the storage device 215 depending on its characteristics. Moreover, image data and video data stored in the storage device 215 are transmitted to the image data management server 113 and the client terminal 141 via the NIC 216. In the case of a camera that does not include the NIC 216 as a constituent element, the camera can be connected directly to the image data management server 113 and the client terminal 141 via a storage device such as an SD memory card.

Figure 2C:
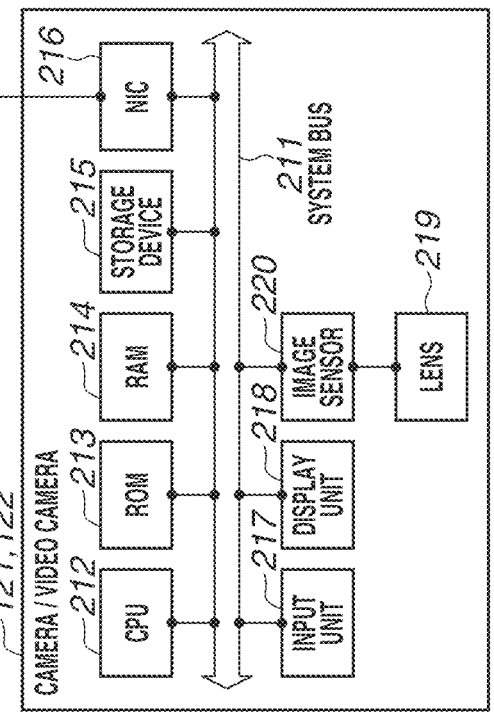

FIG. 2C is a diagram illustrating an example of a hardware configuration of the identification tag 131. A system bus 221 interconnects the respective constituent elements of the identification tag 131. A central processing unit (CPU) 222, which controls the entire tag, comprehensively controls access of each constituent element connected to the system bus 221. A read-only memory (ROM) 223, which is a storage unit, stores various pieces of data such as a basic input-output (I/O) program and identification code for uniquely identifying the identification tag 131 therein. A random access memory (RAM) 224, which is a temporary storage unit, functions as, for example, a main memory and a work area for the CPU 222. A storage device 225, which is an external storage unit, functions as a large-capacity memory and stores, for example, location information data acquired by a global positioning system (GPS) 227. The storage device 225 is, for example, a hard disk drive (HDD) or an SD memory card.

A network interface card (NIC) 226 is used to exchange data between the identification tag 131 and the respective constituent elements illustrated in FIG. 1 via the network 102. The global positioning system (GPS) 227 periodically acquires location information about a domesticated animal with the identification tag 131 attached thereto.

Furthermore, the above-mentioned configuration of the identification tag 131 is merely an example and is not limited to a combination of elements illustrated in FIG. 2C. For example, the storage location for data or programs can be changed to any one of the ROM 223, the RAM 224, and the storage device 225 depending on its characteristics. Moreover, in the case of acquiring, in addition to location information acquired by the GPS 227, biological information such as body temperature and heart rate of a domesticated animal with an identification tag attached thereto, a hardware configuration for acquiring such biological information can be connected to the identification tag 131.

FIG. 2D is a diagram illustrating an example of a hardware configuration of the client terminal 141. A system bus 231 interconnects the respective constituent elements of the client terminal 141. A central processing unit (CPU) 232, which controls the entire terminal, comprehensively controls access of each constituent element connected to the system bus 231.

A read-only memory (ROM) 233, which is a storage unit, stores various pieces of data such as a basic input-output (I/O) program therein. A random access memory (RAM) 234, which is a temporary storage unit, functions as, for example, a main memory and a work area for the CPU 232. A storage device 235, which is an external storage unit, functions as a large-capacity memory and stores, for example, programs associated with the present exemplary embodiment. The storage device 235 is, for example, a hard disk drive (HDD).

A network interface card (NIC) 236 is used to exchange data between the client terminal 141 and the respective constituent elements illustrated in FIG. 1 via the network 103. An input unit 237 is an instruction input unit that receives an instruction via an input device such as a keyboard (not illustrated) or a mouse (not illustrated). A display unit 238 performs displaying via an output device such as a display (not illustrated). Furthermore, in the description of the first exemplary embodiment, the client terminal 141 is assumed to be a smartphone or tablet equipped with a touch display into which the input unit 237 and the display unit 238 are integrated.

A camera 239 is a camera module that acquires image data and video data and stores the acquired image data and video data in the storage device 235. Furthermore, the above-mentioned configuration of the client terminal 141 is merely an example and is not limited to a combination of elements illustrated in FIG. 2D. For example, the storage location for data or programs can be changed to any one of the ROM 233, the RAM 234, and the storage device 235 depending on its characteristics. Moreover, even a client terminal that does not include the camera 239 can be employed in the present exemplary embodiment as long as the client terminal is able to acquire image data and video data from a storage device such as an SD memory card.

FIG. 3 is a diagram illustrating examples of software configurations of respective constituent elements of the livestock body weight estimation system according to the first exemplary embodiment. Each of the camera 121 and the video camera 122 includes a data storage unit 301, a data transmission unit 302, a data reception unit 303, and an image capturing unit 304. The image capturing unit 304 converts light input via the lens 219 into a signal using the image sensor 220.

The data storage unit 301 stores and manages the signal obtained by a conversion operation of the image capturing unit 304 as image data or video data in the storage device 215. The data reception unit 303 connects to the identification tag 131 attached to a domesticated animal serving as a subject for image capturing to be performed by the image capturing unit 304 via the NIC 216 and receives a discrimination ID from a data transmission unit 312 of the identification tag 131. The data storage unit 301 stores the received discrimination ID in the storage device 215 in association with image data or video data stored in the storage device 215. The data transmission unit 302 transmits, to the image data management server 113, image data or video data stored in the storage device 215 and a discrimination ID associated with the image data or video data.

The identification tag 131 includes a data storage unit 311, a data transmission unit 312, and a location information management unit 313. The data storage unit 311 stores and manages a discrimination ID, which is provided for uniquely discriminating the identification tag 131, in the storage device 225. Table 1 shows an example of a data table for discrimination IDs that the data storage unit 311 of the identification tag 131 manages.

TABLE 1

| Discrimination ID Management Table (Identification Tag 131) |
|---|
| Discrimination ID |
| CO001 |

The column "discrimination ID" is a column storing a unique ID allocated to each single identification tag. While a discrimination ID is used as identification information for uniquely specifying a domesticated animal from the identification tag, there is no restriction on the form of identification information and the identification information is not limited to a discrimination ID as long as it is information usable as identification information. The format of a discrimination ID is not intended to be limited as long as its uniqueness is able to be secured depending on the number of usable identification tags. In the livestock body weight estimation system according to the first exemplary embodiment, various pieces of data about domesticated animals to be generated and managed are associated with respective discrimination IDs and are managed by the respective constituent elements.

The data transmission unit 312 transmits a discrimination ID to the camera 121, the video camera 122, and the rearing data management server 112, which are connected to the identification tag 131 via the NIC 226. Moreover, the data transmission unit 312 transmits location information acquired by the location information management unit 313 using the GPS to the activity data management server 111 as appropriate in association with a discrimination ID.

The location information management unit 313 acquires the current location information about the identification tag 131 using the GPS. The acquired location information is stored in the storage device 225 by the data storage unit 311. Furthermore, the format of location information has no direct relevance to the content of the present exemplary embodiment and is, therefore, omitted from description. The location information management unit 313 is assumed to acquire at the very least clock time information and position coordinate information in association with each other and can acquire other pieces of accompanying information without the intention of limiting the allowance of such acquisition in the present exemplary embodiment.

The activity data management server 111 includes a data storage unit 351, a data transmission unit 352, a data reception unit 353, and an activity data analysis unit 354. The data reception unit 353 receives a discrimination ID and location information from the identification tag 131 via the NIC 206. The data storage unit 351 stores and manages the discrimination ID and location information received by the data reception unit 353 in the storage device 205 while associating the discrimination ID and location information with each other. Moreover, the data storage unit 351 also stores and manages activity data, which has been generated by the activity data analysis unit 354 analyzing the location information, in the storage device 205 while associating the activity data with the discrimination ID.

The data transmission unit 352 transmits activity data managed by the data storage unit 351 to the body weight estimation server 114 via the NIC 206 according to a request from the body weight estimation server 114. The activity data analysis unit 354 analyzes the location information received from the identification tag 131, managed by the data storage unit 351, and thus generates activity data about each individual domesticated animal with an identification tag attached thereto. Table 2 shows an example of a data table for activity data generated by the activity data analysis unit 354.

TABLE 2

| Activity Data Table | | | | |
|---|---|---|---|---|
| Discrimination ID | Generation date | Morning movement distance | Afternoon movement distance | Total movement distance |
| CO001 | 2019 Apr. 1 | 5 km | 7 km | 12 km |
| CO001 | 2019 Apr. 2 | 6 km | 6 km | 12 km |
| CO016 | 2019 Apr. 5 | 10 km | 4 km | 14 km |

The activity data analysis unit 354 tallies location information received from the identification tag 131 for each discrimination ID on a daily basis, generates activity data indicating the movement distance of a domesticated animal with an identification tag attached thereto, and manages the activity data with the activity data table. The column "discrimination ID" is a column storing a discrimination ID.

The column "generation date" is a column storing the date on which activity data was generated from location information. The column "morning movement distance" is a column storing the morning movement distance generated from the location information received from the identification tag. The column "afternoon movement distance" is a column storing the afternoon movement distance generated from the location information received from the identification tag. The column "total movement distance" is a column storing the total movement distance a day generated from the location information received from the identification tag.

The rearing data management server 112 includes a data storage unit 361, a data transmission unit 362, and a data reception unit 363. The data reception unit 363 receives a discrimination ID from the identification tag 131 via the NIC 206. Moreover, the data reception unit 363 receives rearing data from the client terminal 141.

The data storage unit 361 stores and manages the discrimination ID and rearing data received by the data reception unit 363 in the storage device 205 while associating the discrimination ID and rearing data with each other. Moreover, the data storage unit 361 receives body weight data estimated by an estimation unit 343 or a re-estimation unit 344 of the body weight estimation server 114 and determined to have an accuracy sufficient to be stored, and stores and manages the body weight data in the storage device 205 in association with the discrimination ID.

The data transmission unit 362 transmits rearing data managed by the data storage unit 361 to the body weight estimation server 114 via the NIC 206 according to a request from the body weight estimation server 114. Tables 3, 4, and 5 show examples of data tables for rearing data managed by the data storage unit 361.

TABLE 3

Rearing Data Table

| Discrimination ID | Recording date | Body weight | Measurement type |
|---|---|---|---|
| CO001 | 2019 Apr. 1 | 100 kg | actual measurement |
| CO001 | 2019 Apr. 2 | 101 kg | estimation |
| CO002 | 2019 Apr. 1 | 120 kg | estimation |

| Discrimination ID | Animal type | Feeding ID | Image ID |
|---|---|---|---|
| CO001 | cattle | FD001 | IM001 |
| CO001 | cattle | FD002 | IM002 |
| CO002 | cattle | FD003 | IM003 |

The rearing data table is used to manage an actually measured body weight of a domesticated animal input via the client terminal 141 and an estimated body weight received from the body weight estimation server 114 in association with feeding data separately managed with a feeding data table.

The column "discrimination ID" is a column storing a discrimination ID. The column "recording date" is a column storing the date on which the body weight of a target domesticated animal and feeding data were associated with each other. The column "body weight" is a column storing the body weight of a domesticated animal. The column "measurement type" is a column storing a value that distinguishes whether the body weight data about a domesticated animal received by the data reception unit 363 has been acquired by actual measurement and input via the client terminal 141 or has been estimated by the body weight estimation server 114. In a case where the body weight data is an actually measured value, "actual measurement" is stored in the column "measurement type", and, in a case where the body weight data is a value estimated by the body weight estimation server 114, "estimation" is stored in the column "measurement type". Out of rearing data to be registered in the livestock body weight estimation system described in the first exemplary embodiment, with regard to rearing data about other than a domesticated animal the body weight of which has been actually measured, the value of the column "body weight" and the value of the column "measurement type" are in an empty state until estimation processing is performed by the body weight estimation server 114.

The column "animal type" is a column storing the type of animal of a target domesticated animal. The column "feeding ID" is a column storing an ID for uniquely identifying feeding data that is managed with a feeding data table described below. The column "image ID" is a column storing an ID for uniquely identifying image data that is managed with an image data table described below.

TABLE 4

Feeding Data Table

| | | Feeding record 1 | | Feeding record 2 | |
|---|---|---|---|---|---|
| Feeding ID | Feeding date | Feed type | Feed amount | Feed type | Feed amount . . . |
| FD001 | 2019 Apr. 1 | coarse feed A | 10 kg | | |
| FD002 | 2019 Apr. 2 | coarse feed A | 9 kg | concentrated feed A | 3 kg |
| FD003 | 2019 Apr. 1 | | | concentrated feed A | 15 kg |

The feeding data table is a table used to manage the type and amount of feed given to a domesticated animal. Furthermore, each item in the feeding data table is an item input to the rearing data management server 112 by a user operation performed via the client terminal 141, and a procedure for the user operation has no direct relevance to the present exemplary embodiment and is, therefore, omitted from description.

The column "feeding ID" is a column storing an ID for uniquely identifying feeding data. The column "feeding date" is a column storing the date on which feed was given to a domesticated animal. The column "feeding record 1" to the column "feeding record N" are columns storing information on the details of feeding content, and the number of such columns correspond to the number of types of given feed. Each column "feeding record" includes a column "feed type" and a column "feed amount". The column "feed type" is a column storing information indicating the type of feed given to a domesticated animal. The column "feed type" stores a value of feed type for uniquely identifying feed master data that is managed with a feed master table described below. The column "feed amount" is a column storing the amount of feed given to a domesticated animal.

TABLE 5

Feed Master Table

| | Constitutive substance 1 | | Constitutive substance 2 | |
|---|---|---|---|---|
| Feed type | Material 1 | Content rate 1 | Material 2 | Content rate 2 |
| coarse feed A | fresh forage | 100% | | |
| coarse feed B | silage | 70% | cured hay | 30% |
| concentrated feed A | field corn | 50% | bran | 40% |

TABLE 5-continued

Feed Master Table

| | Constitutive substance 3 | | |
|---|---|---|---|
| Feed type | Material 3 | Content rate 3 | ... |
| coarse feed A | | | |
| coarse feed B | | | |
| concentrated feed A | soybean oil cake | 10% | |

The feed master table is a table used to manage information on the details of feed given to a domesticated animal. Since, usually, feed to be given to livestock is provided in the form of mixture of one or more types of materials, the particulars of the mixture is managed with the feed master table. The column "feed type" is a column storing information indicating the type of feed to be given to a domesticated animal. The column "constitutive substance 1" to the column "constitutive substance N" are columns storing information on the details of materials constituting feed. The column "constitutive substance" includes a column "material" and a column "content rate". The column "material" is a column storing information indicating a constituent material of feed. The column "content rate" is a column storing the rate of a material indicated by the column "material" contained in the entire feed.

The image data management server 113 includes a data storage unit 331, a data transmission unit 332, a data reception unit 333, and an image data analysis unit 334. The data reception unit 333 receives image data, video data, and a discrimination ID from the camera 121 and the video camera 122 via the NIC 206. Alternatively, the data reception unit 333 receives image data, video data, and a discrimination ID via the client terminal 141.

The data storage unit 331 stores and manages image data, video data, and a discrimination ID received by the data reception unit 333 in the storage device 205 in association with each other. Table 6 shows an example of an image data table that the data storage unit 331 manages.

TABLE 6

Image Data Table

| Image ID | Registration date | Storage path | Discrimination ID |
|---|---|---|---|
| IM001 | 2019 Apr. 1 | /CO001/IM001.jpg | CO001 |
| IM002 | 2019 Apr. 2 | /CO001/IM002.jpg | CO001 |

The column "image ID" is a column storing an identifier generated by the image data management server 113 to uniquely identify image data. The column "registration date" is a column storing date and time information at which the image data management server 113 received image data. The column "storage path" is a column storing a logical path of the storage device 205 of the image data management server 113 in which image data is stored. The column "discrimination ID" is a column storing a discrimination ID associated with image data.

The data transmission unit 332 transmits image data or video data managed by the data storage unit 331 to the body weight estimation server 114 via the NIC 206 according to a request from the body weight estimation server 114. The image data analysis unit 334 analyzes image data or video data managed by the data storage unit 331 and thus extracts an image of a domesticated animal shown in the image data or video data. Additionally, the image data analysis unit 334 extracts, for example, the length and surface area of the entire body of a domesticated animal the image of which has been extracted and the size of each specific region of the domesticated animal, and the data storage unit 331 manages the extracted pieces of data.

Table 7 shows an example of an image analysis data table that the data storage unit 331 manages. Furthermore, in Table 7, an example of analysis data in a case where cattle is targeted as a domesticated animal in the first exemplary embodiment is shown.

TABLE 7

Image Analysis Data Table

| Discrimination ID | Analysis date | Animal type | Entire length |
|---|---|---|---|
| CO001 | 2019 Apr. 1 | cattle | 190 cm |
| CO001 | 2019 Apr. 2 | cattle | 191 cm |

| Discrimination ID | Body surface area | Hip | Hipbone | ... |
|---|---|---|---|---|
| CO001 | 1.6 square meters | 80 cm | 100 cm | |
| CO001 | 1.65 square meters | 80 cm | 102 cm | |

The column "discrimination ID" is a column storing a discrimination ID associated with the analyzed image data. The column "analysis date" is a column storing the date on which the image data analysis unit 334 analyzed image data. The column "animal type" is a column storing the type of animal of a target domesticated animal. The column "entire length" is a column storing the entire length calculated from a domesticated animal image extracted from image data.

The column "body surface area" is a column storing the body surface area calculated from a domesticated animal image extracted from image data. The column "hip" is a column storing the length of body limited to a hip calculated from a domesticated animal image extracted from image data. The column "hipbone" is a column storing the length of body limited to a hipbone calculated from a domesticated animal image extracted from image data.

Since image analysis results to be stored in the image analysis data table vary in conformity with a learning model that is used by a learning unit 342, described below, of the body weight estimation server 114, the contents of the image analysis results are not limited to the items shown in Table 7. A procedure and method for extracting a domesticated animal image from image data or video data and a procedure and method for calculating, for example, the body surface area or the length of a specific region from a domesticated animal image have no direct relevance to the content of the present exemplary embodiment and are, therefore, omitted from description.

The body weight estimation server 114 includes a data storage unit 341, a learning unit 342, an estimation unit 343, a re-estimation unit 344, a data reception unit 345, and a data transmission unit 346. The data reception unit 345 receives a body weight estimation request from a data transmission unit 322 of the client terminal 141 via the NIC 206. Moreover, the data reception unit 345 receives various pieces of data required for body weight estimation from the activity data management server 111, the rearing data management server 112, and the image data management server 113 in response to the body weight estimation request received from the client terminal 141.

The data storage unit 341 stores and manages respective body weight estimation programs that are executed by the estimation unit 343 and the re-estimation unit 344 with use of learning models 402 and 412, described below, which are generated by the learning unit 342. The learning unit 342 performs learning with use of activity data, rearing data, and image analysis data received via the data reception unit 345, and generates and educates learning models 402 and 412.

The estimation unit 343 executes the body weight estimation program using the learning model 402 and thus estimates body weight data from image analysis data about a domesticated animal received by the data reception unit 345. The re-estimation unit 344 executes the body weight estimation program using the learning model 412 and thus estimates body weight data from image analysis data, rearing data, and activity data about a domesticated animal received by the data reception unit 345. The data transmission unit 346 transmits the estimated body weight data to the client terminal 141, from which the body weight estimation request has been received via the NIC 206. Moreover, the data transmission unit 346 transmits the estimated body weight data to the rearing data management server 112, thus storing the estimated body weight data in a column "body weight" of data the discrimination ID of which coincides with the discrimination ID in the rearing data table.

Figure 4A:
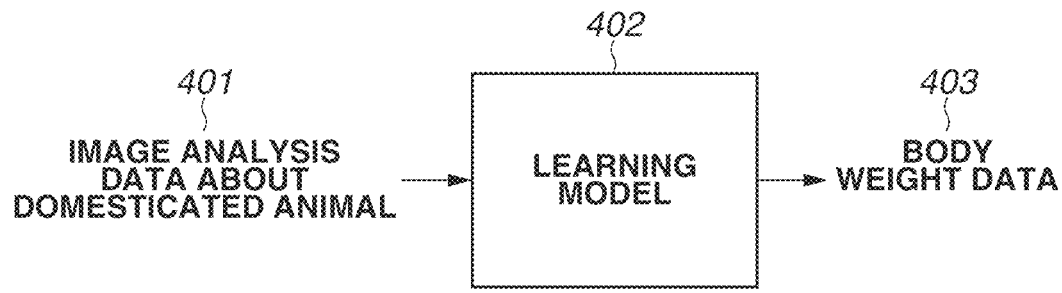
FIGS. 4A and 4B are conceptual diagrams illustrating respective relationships between learning models which are respectively used in an estimation unit and a re-estimation unit and inputs and outputs thereof.
Figure 4B:
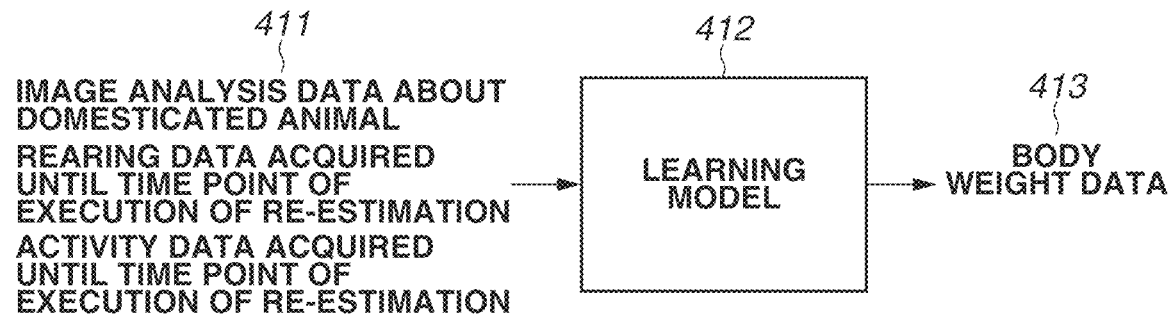

FIGS. 4A and 4B are conceptual diagrams illustrating respective relationships between learning models that are respectively used in the learning unit 342 and the estimation unit 343 and the re-estimation unit 344 and inputs and outputs thereof. FIG. 4A is a conceptual diagram illustrating a relationship between a learning model 402 that a body weight estimation program executed by the estimation unit 343 uses and input data 401 and output data 403 thereof. The learning model 402 is a learning model that the learning unit 342 generates. The input data 401 is data obtained by vectorizing image analysis data about a domesticated animal received by the data reception unit 345. The output data 403 is estimated body weight data about an individual domesticated animal corresponding to the input image analysis data.

FIG. 4B is a conceptual diagram illustrating a relationship between a learning model 412 that a body weight re-estimation program executed by the re-estimation unit 344 uses and input data 411 and output data 413 thereof. The learning model 412 is a learning model that the learning unit 342 generates. The input data 411 is data obtained by vectorizing image analysis data about a domesticated animal received by the data reception unit 345 and rearing data and activity data acquired until the time point of execution of re-estimation. The output data 413 is re-estimated body weight data about an individual domesticated animal corresponding to the input respective pieces of data.

The execution timing of a body weight estimation program for a domesticated animal using the learning models 402 and 412 can be implemented in response to a body weight estimation request from the client terminal 141. Moreover, such execution timing can be previously implemented, prior reception of a request from the client terminal 141, in response to the body weight estimation server 114 detecting the timing at which the image data management server 113 has received image data.

FIG. 5 is a flowchart illustrating the details of a series of processing operations that the learning unit 342 performs to generate a learning model. In step S501, the data reception unit 345 of the body weight estimation server 114 acquires image analysis data managed with the image analysis data table from the image data management server 113.

In step S502, the data reception unit 345 acquires, from the rearing data management server 112, out of pieces of rearing data managed with the rearing data table, rearing data the value of the column "discrimination ID" of which coincides with the value of the discrimination ID of the data received in step S501 and the value of the column "measurement type" of which is "actual measurement". Additionally, the data reception unit 345 also acquires, from the feeding data table, feeding data the value of the column "feeding ID" of which coincides with the value of the column "feeding ID" of the acquired rearing data and acquires, from the feed master table, feed master data the value of the column "feed type" of which coincides with the value of the column "feed type" of the feeding data. Moreover, the data reception unit 345 acquires, from the activity data management server 111, out of pieces of activity data managed with the activity data table, activity data the value of the column "discrimination ID" of which coincides with the value of the column "discrimination ID" of the data received in step S501. In step S503, the data reception unit 345 classifies the respective pieces of learning data received in step S501 and step S502 into input data and correct answer data that are involved in the learning unit 342.

Table 8 is a data table showing examples of input data and correct answer data that are involved in the learning model 402.

TABLE 8

Learning Data Table for Use in Learning of Learning Model 402

| Input data (input data 401) | Correct answer data (output data 403) |
|---|---|
| animal type entire length body surface area hip hipbone | body weight |

Learning of the learning model 402 is performed with use of data items included in the image analysis data as input data. Furthermore, in the first exemplary embodiment, there are no restrictions on analysis results that are able to be obtained from image data about a domesticated animal as input data. An analysis result that is appropriate according to a body weight estimation method can be applied as input data. For example, according to a method of estimating a body weight based on the body surface area of an animal as discussed in Japanese Patent Application Laid-Open No. 2016-59300, only a data item "body surface area" of image analysis data can be selected as input data.

Table 9 is a data table showing examples of input data and correct answer data that are involved in the learning model 412.

TABLE 9

Learning Data Table for Use in Learning of Learning Model 412

| Input data (input data 411) | Correct answer data (output data 413) |
|---|---|
| animal type<br>entire length<br>body surface area<br>hip<br>hipbone<br>total movement distance<br>feed amount (fresh forage)<br>feed amount (field corn, bran, soybean oil cake) | body weight |

Learning by the learning model 412 is performed with use of data items included in the image analysis data, the feeding data, and the activity data. Furthermore, with regard to the feeding data, the amount of an actually given material in feed indicated by the value of the column "feed type" is calculated and set as input data. For example, as explained with the feeding data shown in Table 4, in a case where 10 kg of coarse feed A has been given to a domesticated animal, 10 kg (10 kg×100%) of fresh forage, which is a material of coarse feed A, is employed as input data.

In step S504, the learning unit 342 converts the respective pieces of learning data classified in step S503 into input vectors and correct answer vectors. In step S505, the learning unit 342 performs learning processing using all of the items of the pieces of learning data converted into vectors in step S504 on an item-by-item basis. If it is determined that learning processing has been completed on all of the items (NO in step S505), the learning unit 342 ends a series of processing operations illustrated in the present flowchart.

In step S506, the learning unit 342 performs learning processing on the learning model 402 with use of learning data shown in Table 8. In step S507, the learning unit 342 performs learning processing on the learning model 412 with use of learning data shown in Table 9. Since the GPU 209 is able to perform efficient calculation by performing parallel processing of much more data, in the case of performing learning a plurality of times using a learning model such as deep learning, it is effective to cause the GPU 209 to perform processing. Therefore, in the first exemplary embodiment, the GPU 209 is used, in addition to the CPU 202, for processing to be performed by the learning unit 342. Specifically, in the case of executing a learning program including a learning model, the CPU 202 and the GPU 209 cooperate to perform calculation for execution of learning. Furthermore, processing to be performed by the learning unit 342 can be attained by calculation performed by only the CPU 202 or the GPU 209. Moreover, processing to be performed by the estimation unit 343 can also be attained by calculation performed by the GPU 209, as with the learning unit 342.

In steps S506 and S507, the learning unit 342 performs learning with use of a support vector machine (SVM) in such a manner that a correct answer vector is obtained from input vectors with respect to one setting item in the input vectors and correct answer vectors obtained by conversion. The SVM is a known machine learning algorithm, and, in the first exemplary embodiment, a non-linear soft margin SVM implemented by the radial basis function kernel (RBF kernel) is used. During learning, a learning result is evaluated by cross-validation which divides learning data into analysis data and validation data in random order. Moreover, since hyper-parameters of the SVM using the RBF kernel include a cost parameter (C) and a gamma parameter (γ) and thus affect an estimation performance, grid search, which exhaustively tests a plurality of values of the cost parameter (C) and the gamma parameter (γ), is performed and the result of learning highest in estimation performance is set as a learning result. The SVM is able to perform learning for both classification and regression.

In the first exemplary embodiment, regression is performed to estimate the body weight of a domesticated animal. Here, examples of the machine learning algorithm include perceptron or logistic regression, neural network, the k-nearest neighbors algorithm, naive Bayes, recurrent neural network, and convolutional neural network. Moreover, there are other various methods such as decision tree, random forest, linear regression, polynomial regression, lasso regression, and ridge regression. Moreover, the SVM includes various types, such as a hard-margin SVM and a polynomial kernel SVM. Hyper-parameters in machine learning algorithms also differ depending on the machine learning algorithms.

Examples of the method of evaluating a learning result include, in addition to the cross validation method, an alternative estimation method and a test sample method. Additionally, examples of the method of optimizing hyper-parameters in the machine learning algorithm include, in addition to grid search, random search, a Latin hypercube sampling method, and a Bayesian optimization method. In the first exemplary embodiment, learning methods such as the machine learning algorithm, the method of evaluating a learning result, and the method of optimizing hyper-parameters in the machine learning algorithm can be changed as appropriate.

In step S508, the data storage unit 341 stores a trained model, which has been obtained as a result of learning, in the storage device 205. The client terminal 141 includes a data storage unit 321, a data transmission unit 322, a data reception unit 323, and an estimation result display unit 324. In a case where the client terminal 141 includes the camera 239 as a constituent element as with a smartphone, the data storage unit 321 stores and manages captured image data or video data. Moreover, the data storage unit 321 manages the stored image data or video data in association with the discrimination ID of an identification tag 131 attached to a domesticated animal serving as a subject, which is connected to the client terminal 141 via the NIC 236.

The data transmission unit 322 designates and transmits image data, video data, and a discrimination ID, which are managed by the data storage unit 321, to the image data management server 113, and transmits a body weight estimation request to the body weight estimation server 114. Moreover, in a case where image data or video data that is to be used for estimation has already been transmitted to the image data management server 113 via the camera 121 or the video camera 122, the data transmission unit 322 transmits only a discrimination ID that is to be used for body weight estimation to the body weight estimation server 114.

The data reception unit 323 receives estimated body weight data from the data transmission unit 346 of the body weight estimation server 114. The received estimated body weight data is displayed by the estimation result display unit 324 on the display unit 238 of the client terminal 141.

FIG. 6 is a diagram illustrating an operation sequence of the body weight estimation system according to the present exemplary embodiment using the learning models illustrated in FIGS. 4A and 4B. A processing operation that the activity data analysis unit 354 in the activity data management server 111 performs to generate activity data from location information received from the identification tag 131 and a processing operation that the rearing data management server 112 performs to receive feeding data from the client terminal 141 are periodically performed. Moreover, these processing operations are performed independently of the operation of the body weight estimation system. Furthermore, in FIG. 6, the body weight estimation system according to the present exemplary embodiment is described on the premise that the client terminal 141 is a smartphone equipped with the camera 239.

In step S601, first, the client terminal 141 connects to the identification tag 131 attached to a domesticated animal serving as a subject via the NIC 236, and receives a discrimination ID from the data transmission unit 312 of the identification tag 131. Next, the client terminal 141 captures an image of the domesticated animal with use of the camera 239. Furthermore, a method of identifying a discrimination ID, without using the NIC 236, by recognizing the identification tag 131 from a captured image of the domesticated animal can be employed. In step S602, the client terminal 141 transmits image data acquired by image capturing in step S601 and the discrimination ID to the image data management server 113 via the NIC 236.

In step S603, the client terminal 141 transmits, to the body weight estimation server 114, a body weight estimation request about a domesticated animal shown in the image data that the client terminal 141 has transmitted to the image data management server 113 in step S602. The client terminal 141 is assumed to transmit, at this timing, a discrimination ID identified from an identification tag serving as identification information, but can transmit the discrimination ID at other timing. Such a body weight estimation request is an estimation request that is transmitted for the first time.

In step S604, the body weight estimation server 114 receives, from the image data management server 113, image analysis data that the image data analysis unit 334 has generated from image data received from the client terminal 141. In step S605, the estimation unit 343 of the body weight estimation server 114 extracts input data from the respective columns of the image analysis data received in step S604, inputs the input data to the learning model 402, and then estimates the body weight.

In step S606, out of pieces of rearing data the discrimination ID of which coincides with the discrimination ID received from the client terminal 141 in step S603, the body weight estimation server 114 acquires rearing data the recording date of which is the latest from among pieces of rearing data in each of which a value is stored in the column "body weight". Then, the data transmission unit 346 of the body weight estimation server 114 transmits, to the client terminal 141, the value of the body weight data estimated in step S605 and data about a difference between the latest body weight data acquired from the rearing data management server 112 and the estimated body weight data.

At this time, in a case where the value of the body weight data estimated by the body weight estimation server 114 does not have a satisfactory degree of accuracy, in step S607, the user of the body weight estimation system is allowed to request the body weight estimation server 114 via the client terminal 141 to re-perform estimation. This is referred to as a "re-estimation request", which means retransmitting an estimation request. Specifically, this is performed in a case where data about a difference between the estimated body weight data received in step S606 and the latest body weight data does not have a realistic value, such as a case where the body weight has increased to such a degree as not to be sound realistic.

In step S608, the body weight estimation server 114, which has received a request for re-performing body weight estimation, receives activity data and rearing data the discrimination ID of each of which coincides with the discrimination ID received in step S603, from the activity data management server 111 and the rearing data management server 112, respectively.

In step S609, the re-estimation unit 344 of the body weight estimation server 114 extracts input data from the respective columns of the image analysis data received in step S604 and the activity data and rearing data received in step S608, inputs the extracted input data to the learning model 412, and then estimates the body weight. Furthermore, while, in the description of the first exemplary embodiment, step S609 is executed to perform re-estimation, step S609 does not need to be executed after estimation is performed in step S605. A configuration in which, without processing operations in step S603 to step S606 being performed, a request for estimation is made in step S607 from the beginning can be employed.

In step S610, the body weight estimation server 114 transmits the re-estimated body weight data to the client terminal 141. Furthermore, if the body weight data re-estimated in step S609 also does not have a satisfactory degree of accuracy, the user of the body weight estimation system actually measures the body weight of a domesticated animal serving as a subject and directly inputs the actually measured value to the rearing data management server 112. Moreover, the thus-input actually measured value of body weight data is used as learning data for the learning model 402 and the learning model 412.

FIG. 7 is a flowchart illustrating the details of body weight estimation processing that the body weight estimation server 114 performs, the outline of which has been described in step S606 and step S608. In step S701, the data reception unit 345 of the body weight estimation server 114 requests the image data management server 113 to transmit image analysis data the discrimination ID of which coincides in value with the discrimination ID received in step S603. The data storage unit 331 of the image data management server 113 refers to the image analysis data table, and checks the presence or absence of image analysis data the discrimination ID of which coincides with that of the image analysis data targeted for the request and the analysis date of which coincides with that of the image analysis data targeted for the request. At this time, in a case where the image data analysis unit 334 has not yet completed analysis processing of image data received in step S602, the intended image analysis data has not still been registered in the image analysis data table. In that case, the body weight estimation server 114 waits until the image data analysis unit 334 completes the analysis processing.

Upon completion of the analysis processing by the image data analysis unit 334 (YES in step S701), then in step S702, the data reception unit 345 acquires the image analysis data from the image data management server 113. In step S703, the estimation unit 343 extracts input data from the image analysis data acquired in step S702, inputs the extracted input data to the learning model 402, and performs body weight estimation processing. At this time, items to be extracted as input data from the image analysis data depend on a body weight estimation logic that the learning model 402 has been trained, and not all of the items of the image analysis data necessarily need to be extracted as input data.

In step S704, out of pieces of rearing data the discrimination ID of which coincides with the discrimination ID received from the client terminal 141 in step S603, the data reception unit 345 acquires rearing data the recording date of which is the latest from among pieces of rearing data in each of which a value is stored in the column "body weight". In step S705, the data transmission unit 346 transmits, to the client terminal 141, the estimated body weight data estimated in step S703 and difference data about a difference between the estimated body weight data and the last body weight data received in step S704. The data reception unit 323 displays the estimated body weight data and the difference data received from the body weight estimation server 114 on the estimation result display unit 324. Furthermore, while the last body weight data is used, body weight data to be used does not necessarily need to be the last body weight data as long as it is previous body weight data. It is additionally mentioned that, if the previous body weight data is too old, its significance would be lessened.

If, in step S706, the body weight estimation server 114 has received a re-estimation request for body weight via the input unit 237 of the client terminal 141 (YES in step S706), the body weight estimation server 114 advances the processing to step S707. If the body weight estimation server 114 has not received a re-estimation request for body weight (NO in step S706), the data transmission unit 346 transmits the value of the body weight data estimated in step S703 to the rearing data management server 112. The data reception unit 363 registers, in the rearing data table managed by the data storage unit 361, rearing data in which the value of the received estimated body weight data is stored in the column "body weight" and the value "estimation" is stored in the column "measurement type".

In step S707, the data reception unit 345 receives, from the activity data management server 111, activity data the discrimination ID of which coincides with the discrimination ID received in step S603. In step S708 the data reception unit 345 receives, from the rearing data management server 112, rearing data the discrimination ID of which coincides with the discrimination ID received in step S603.

In step S709, the re-estimation unit 344 extracts respective pieces of input data from the image analysis data acquired in step S702, the activity data acquired in step S707, and the rearing data acquired in step S708. Then, the re-estimation unit 344 inputs the extracted pieces of input data to the learning model 412 and thus performs re-estimation processing for body weight. Using the learning model 412 including a plurality of factors such as the movement distance per day of a domesticated animal and the amount and quality of feed and a plurality of factors affecting the body weight and presenting a viewpoint different from that of image analysis data enables anticipating more highly accurate estimation processing than that of image analysis data.

In step S710, the data transmission unit 346 transmits re-estimated body weight data estimated in step S709 to the client terminal 141. The data reception unit 323 displays, on the estimation result display unit 324, the re-estimated body weight data received from the body weight estimation server 114. Furthermore, as mentioned above, a configuration in which estimation processing in step S709 is performed only when a re-estimation request has been received does not need to be employed, but another configuration in which, after processing in step S701 is performed, without processing operations in step S702 to step S706 being performed, processing in step S707 is performed can be employed.

Figure 8A:
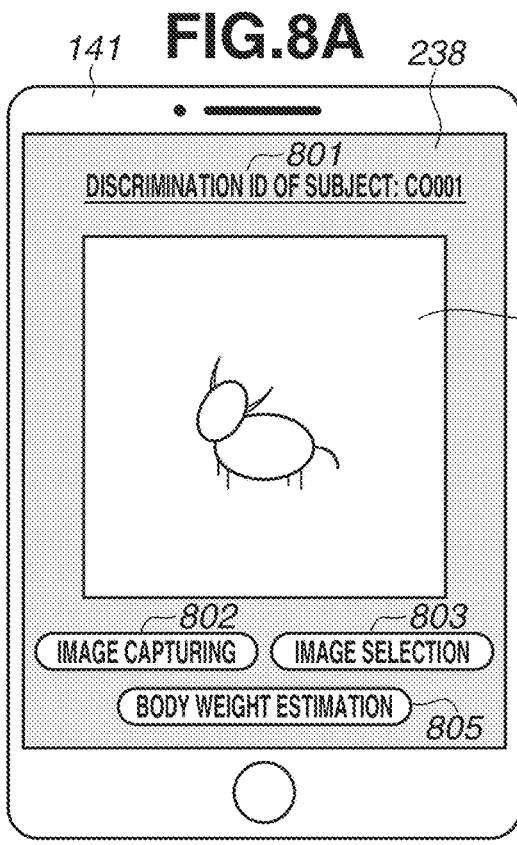
FIGS. 8A, 8B, and 8C are diagrams illustrating examples of user interfaces each of which is displayed on a client terminal in the first exemplary embodiment.
Figure 8B:
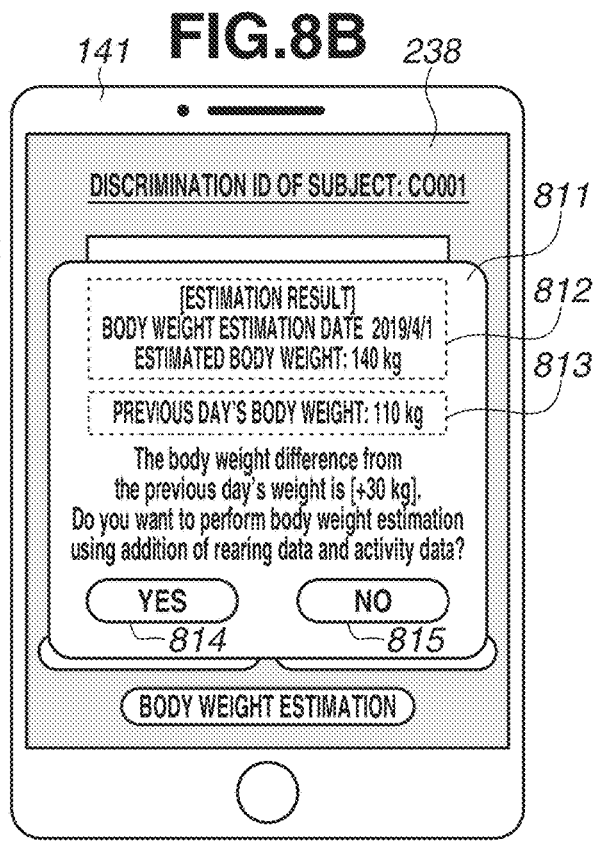
Figure 8C:
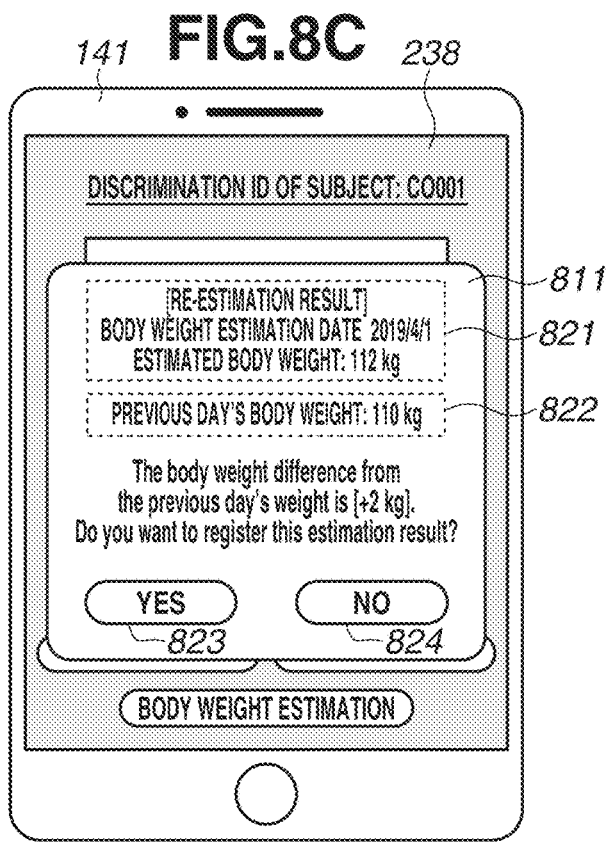

FIGS. 8A, 8B, and 8C are diagrams illustrating examples of user interfaces each of which is displayed on the client terminal 141 in the body weight estimation system according to the first exemplary embodiment. FIG. 8A is a diagram illustrating an example of a user interface that is displayed on the display unit 238 of the client terminal 141 in steps S601 and S602.

A discrimination ID indication label 801 is a label which, when an identification tag 131 for a domesticated animal is connected to the client terminal 141 via the NIC 236, indicates the value of a discrimination ID represented by the identification tag 131. Moreover, when the user has pressed an image selection button 803 described below and has selected image data, the discrimination ID indication label 801 indicates the value of a discrimination ID associated with the selected image data.

When an image capturing button 802 is pressed by the user, a user interface (not illustrated) used to operate the camera 239 is displayed on the display unit 238, so that it becomes possible for the user to perform image capturing of a domesticated animal in step S601. When the image selection button 803 is pressed by the user, a user interface (not illustrated) used to select image data targeted for body weight estimation from among pieces of image data about the respective domesticated animals stored in the storage device 235 of the client terminal 141 is displayed on the display unit 238.

When image data targeted for body weight estimation is captured or selected, the image data is displayed in an image data display area 804. When a body weight estimation button 805 is pressed by the user, image data currently displayed in the image data display area 804 and a discrimination ID currently indicated in the discrimination ID indication label 801 are transmitted to the image data management server 113 in step S602. Moreover, at the same time, the discrimination ID currently indicated in the discrimination ID indication label 801 is transmitted as a body weight estimation request to the body weight estimation server 114 in step S603.

FIG. 8B is a diagram illustrating an example of a user interface that is displayed on the display unit 238 of the client terminal 141 in step S606. An estimation result display dialog 811 is a dialog that the estimation result display unit 324 displays in step S606. The estimation result display dialog 811 is configured with an estimated body weight data indication label 812, a difference weight body data indication label 813, a re-estimation request button 814, and an estimation request ending button 815.

The estimated body weight data indication label 812 is a label that indicates estimated body weight data received in step S606. The difference weight body data indication label 813 is a label that indicates difference body weight data received in step S606. When the re-estimation request button 814 is pressed by the user, in step S607, the data transmission unit 322 transmits a re-estimation request to the body weight estimation server 114. When the estimation request ending button 815 is pressed by the user, body weight data estimated in step S605 is registered with the rearing data management server 112, so that the body weight estimation processing ends.

FIG. 8C is a diagram illustrating an example of a user interface that is displayed on the display unit 238 of the client terminal 141 in step S610. With regard to step S610, the estimation result display dialog 811 is configured with a re-estimated body weight data indication label 821, a difference body weight data indication label 822, a re-estimation request ending button 823, and an estimation interruption button 824.

The re-estimated body weight data indication label 821 is a label that indicates re-estimated body weight data received in step S610. The difference body weight data indication label 822 is a label that indicates difference body weight data received in step S610. When the re-estimation request ending button 823 is pressed by the user, body weight data estimated in step S609 is registered with the rearing data management server 112, so that the body weight estimation processing ends. When the estimation interruption button 824 is pressed by the user, a series of estimation processing operations is interrupted, and the display unit 238 ends displaying the user interface.

Furthermore, while the form of providing a user interface is employed as an example of a method of presentation to the user, the method of presentation further includes, for example, an e-mail and a sound or voice. In any case, any method of presentation can be employed as long as it is a method of presentation according to which a result of body weight estimation is transferred to the user.

As described above, using a result of collecting and learning data obtained by analyzing image data about a domesticated animal, as the learning model 402, in the body weight estimation server 114 enables estimating body weight data about the domesticated animal without touching the domesticated animal. Moreover, using a result of collecting and learning daily activity data and feeding data about a domesticated animal, as the learning model 412, in the body weight estimation server 114 and verifying and re-estimating body weight data estimated with a single piece of analysis data obtained from an image enables increasing the accuracy of an estimation result. Moreover, as a modification example of the first exemplary embodiment, a configuration in which a trained model obtained by performing learning also using activity data and rearing data is used not at the timing of usage in re-estimation but at the timing of the first estimation request has been described. This configuration enables acquiring high-accuracy body weight data without performing estimation twice.

In the above-described first exemplary embodiment, a configuration in which, with respect to a body weight estimation result about a domesticated animal obtained with use of image analysis data, the user of the body weight estimation system checks a difference from the last body weight data and then determines the necessity or unnecessity of re-estimation has been described. The increase or decrease value of the body weight of an animal per day is able to be supposed to some extent. For example, a case where the difference is extremely large may make the accuracy of image analysis data input to the learning model 402 questionable. In such a case, re-estimation processing should be performed without the need to wait for receiving a re-estimation request from the user in step S607.

A second exemplary embodiment of the present invention is directed to an example in which, in a case where the accuracy of a result of body weight estimation processing using the learning model 402 is low, re-estimation processing using the learning model 412 is performed without the user of the body weight estimation system transmitting a re-estimation request. Furthermore, the following description focuses on only differences from the above-described first exemplary embodiment and a modification example thereof, and portions that are not mentioned in the following description are assumed to be the same as those described in the first exemplary embodiment and a modification example thereof.

FIG. 9 is a flowchart illustrating the details of body weight estimation processing that the body weight estimation server 114 performs in the second exemplary embodiment. Furthermore, according to the flowchart for estimation processing in the second exemplary embodiment illustrated in FIG. 9, steps S606 and S607 become not performed in the sequence diagram for the body weight estimation system illustrated in FIG. 6.

Steps S901 to S904 are similar processing operations to those in steps S701 to S704 and are, therefore, omitted from description. In step S905, the estimation unit 343 calculates a difference between the estimated body weight data estimated in step S903 and the last body weight data acquired in step S904. Then, the estimation unit 343 refers to a re-estimation threshold value table that is managed by the data storage unit 341, checks whether the calculated difference exceeds a threshold value, and thus determines the accuracy of estimation processing that the estimation unit 343 has performed in step S903.

Table 10 is a data table showing an example of the re-estimation threshold value table that is managed by the data storage unit 341.

TABLE 10

| Re-estimation Threshold Value Table | |
|---|---|
| Estimation target animal type | Threshold value |
| Cattle | ±5 kg |
| Pig | ±2 kg |
| Chicken | ±300 g |
| ... | ... |

The column "estimation target animal type" is a column storing the type of an animal targeted for body weight estimation. The re-estimation threshold value table stores threshold values corresponding to respective types of animals. The column "threshold value" is a column storing a difference value allowable between body weight data obtained as an estimation result and the last body weight data.

If, in step S905, it is determined that a result obtained by inputting image analysis data to the learning model 402 is body weight data exceeding the range of limits of a threshold value stored in the re-estimation threshold value table (YES in step S905), the estimation unit 343 determines that re-estimation is need, and then advances the processing to step S906. Steps S906 to S909 are similar processing operations to those in steps S707 to S710 and are, therefore, omitted from description.

As described above, determining the accuracy of body weight estimation processing using image analysis data as input data with use of a previously determined threshold value enables performing body weight re-estimation processing without the user of the body weight estimation system consciously making a request, and thus enables providing high-accuracy estimated body weight data.

In the above-described first and second exemplary embodiments, a system which, without touching a domesticated animal, estimates a body weight thereof with the use of image data, activity data, and rearing data has been described. Depending on the number of domesticated animals to be reared, even if the body weight is able to be estimated from image data, performing image capturing of animals on an animal-by-animal basis may still become a work burden.

A third exemplary embodiment of the present invention is directed to an example of a system which, without manually performing image capturing of domesticated animals on an animal-by-animal basis as mentioned in the above background, periodically performs image capturing of domesticated animals via the video camera 122 that is located in a rearing farm and collectively estimates body weights of a plurality of domesticated animals. Furthermore, the following description focuses on only differences from the above-described first and second exemplary embodiments and modification examples thereof, and portions that are not mentioned in the following description are assumed to be the same as those described in the first and second exemplary embodiments and modification examples thereof.

FIG. 10 is a diagram illustrating an operation sequence of a body weight collective estimation system for a plurality of domesticated animals. In step S1001, the video camera 122 performs image capturing for video data of domesticated animals with respective identification tags 131 attached thereto connected via the data reception unit 303. The data storage unit 301 manages video data and a discrimination ID represented by an identification tag 131 of a domesticated animal shown in the video data while associating the video data and the discrimination ID with each other.

In step S1002, the data transmission unit 302 transmits, to the image data management server 113, the video data obtained by image capturing in step S1001 and the discrimination ID. Furthermore, image capturing for video data and transmission thereof are periodically performed. The frequency of such periodic image capturing and transmission is assumed to be, for example, an interval of several hours, fixed time, or real time, and is not limited to a specific frequency in the present exemplary embodiment. The image data analysis unit 334 of the image data management server 113 divides the received video data into pieces of image data about the respective subjects shown in the video data, generates image analysis data from each of the pieces of image data, and stores the generated image analysis data in the data storage unit 331. Furthermore, a procedure for extracting pieces of image data from video data has no direct relevance to the present exemplary embodiment and is, therefore, omitted from description. The data storage unit 331 collectively manages pieces of image analysis data for respective discrimination IDs.

In step S1003, the data reception unit 345 of the body weight estimation server 114 collectively acquires pieces of image analysis data that have not yet been subjected to estimation processing from the image data management server 113. In step S1004, the learning unit 342 inputs all of the pieces of image analysis data acquired in step S1003 to the learning model 402 and thus performs body weight estimation processing. Moreover, in a case where there is a plurality of pieces of estimated body weight data the discrimination IDs of which are the same, the learning unit 342 determines an estimated value with the highest accuracy from among the pieces of estimated body weight data.

In step S1005 and step S1006, the body weight estimation server 114 receives, from the activity data management server 111 and the rearing data management server 112, activity data and rearing data the discrimination ID of each of which coincides with the discrimination ID received together with image analysis data in step S1003, respectively.

In step S1007, the re-estimation unit 344 extracts pieces of input data from the respective columns of the pieces of image analysis data received in step S1003 and the activity data and rearing data received in steps S1005 and S1006, inputs the extracted pieces of input data to the learning model 412, and thus performs body weight estimation. Moreover, in a case where there is a plurality of pieces of estimated body weight data the discrimination IDs of which are the same, the re-estimation unit 344 determines an estimated value with the highest accuracy from among the pieces of estimated body weight data. In step S1008, the body weight estimation server 114 transmits, to the client terminal 141, all of the pieces of body weight data estimated in step S1004 and step S1007 for every discrimination ID.

FIG. 11 is a flowchart illustrating the details of body weight estimation processing using a plurality of pieces of image analysis data generated from video data, which the body weight estimation server 114 performs, and the outline of which has been described with regard to step S1004 and step S1007.

In step S1101, the data reception unit 345 of the body weight estimation server 114 requests the image data management server 113 to transmit all of the pieces of image analysis data that have not been subjected to estimation processing out of pieces of image analysis data the value of the discrimination ID of each of which coincides with the value of the discrimination ID received in step S1003.

The data storage unit 331 of the image data management server 113 refers to the image analysis data table, and checks the presence or absence of image analysis data the discrimination ID of which coincides with that of the image analysis data targeted for the request and the analysis date of which coincides with that of the image analysis data targeted for the request. At this time, in a case where the image data analysis unit 334 has not yet completed analysis processing of image data received in step S1002, the intended image analysis data has not still been registered in the image analysis data table. In that case, in step S1102, the body weight estimation server 114 acquires only pieces of image analysis data generated by the image data analysis unit 334. In step S1103, the estimation unit 343 selects image analysis data that has not yet been subjected to estimation processing from among the pieces of image analysis data acquired in step S1102.

In step S1104, the estimation unit 343 extracts input data from the image analysis data, inputs the extracted input data to the learning model 402, and performs body weight estimation processing. At this time, items to be extracted as input data from the image analysis data depend on a body weight estimation logic that the learning model 402 has been trained, and not all of the items of the image analysis data necessarily need to be extracted as input data. For example, in a case where the body weight estimation logic for the learning model 402 is a logic that is based on the body surface area of a domesticated animal as discussed in Japanese Patent Application Laid-Open No. 2016-59300, the estimation unit 343 extracts the values of the column "animal type" and the column "body surface area" as input data.

In step S1105, the data storage unit 341 manages an estimation result in association with a discrimination ID. In a case where the estimation unit 343 has performed estimation processing on pieces of image analysis data the discrimination IDs of which are the same and the analysis results of which differ from each other, the data storage unit 341 collectively manages estimation results for such pieces of image analysis data. In step S1106, the data reception unit 345 receives, from the activity data management server 111, all of the pieces of activity data the discrimination ID of each of which coincides with the discrimination ID received in step S1003.

In step S1107, the data reception unit 345, receives, from the rearing data management server 112, all of the pieces of rearing data the discrimination ID of each of which coincides with the discrimination ID received in step S1003. In step S1108, the re-estimation unit 344 selects image analysis data that has not yet been subjected to re-estimation processing from among the pieces of image analysis data acquired in step S1102.

In step S1109, the re-estimation unit 344 extracts respective pieces of input data from the pieces of image analysis data acquired in step S1102, the pieces of activity data received in step S1106, and the pieces of rearing data received in step S1107. Then, the re-estimation unit 344 inputs the extracted pieces of input data to the learning model 412 and performs body weight re-estimation processing. Using the learning model 412 including a plurality of factors such as the movement distance per day of a domesticated animal and the amount and quality of feed given to the domesticated animal and a plurality of factors affecting the body weight and presenting a viewpoint different from that of image analysis data enables anticipating more highly accurate estimation processing than that of image analysis data. In step S1110, the data storage unit 341 manages a re-estimation result in association with a discrimination ID. In a case where the re-estimation unit 344 has performed re-estimation processing on pieces of image analysis data the discrimination IDs of which are the same and the analysis results of which differ from each other, the data storage unit 341 collectively manages re-estimation results for such pieces of image analysis data.

In step S1111, the estimation unit 343 selects an estimation result with the highest accuracy from among estimation results collectively acquired for each discrimination ID in step S1105. Similarly, the re-estimation unit 344 selects an estimation result with the highest accuracy from among estimation results collectively acquired for each discrimination ID in step S1110. Not all of the images of domesticated animals shown in image data generated from video data by the image data analysis unit 334 of the image data management server 113 are necessarily images captured at the same angle. Depending on the recording timing of video data used for generation of image data, the entire body of a domesticated animal may be shown in image data or only a part of the body thereof may be shown in image data.

The estimation unit 343 and the re-estimation unit 344 perform body weight estimation processing while selecting learning models 402 and 412 each of which uses an estimation program most appropriate for image analysis data obtained from such image data. Since there is assumed to be a difference in accuracy between estimation programs, in step S1111, each of the estimation unit 343 and the re-estimation unit 344 selects an estimation result that seems to have the highest accuracy. With regard to a method of selecting a representative estimation result, for example, each of the estimation unit 343 and the re-estimation unit 344 calculates a difference from the last body weight data about each domesticated animal as with the method used in step S905, and selects a result in which the difference value is the smallest as a representative estimation result.

In step S1112, the data transmission unit 346 transmits, to the client terminal 141, all of the pieces of estimated body weight data and re-estimated body weight data determined in step S1111 and pieces of image data used for estimation of such pieces of estimated data. The data reception unit 323 displays the re-estimated body weight data received from the body weight estimation server 114 on the estimation result display unit 324.

Figure 12B:
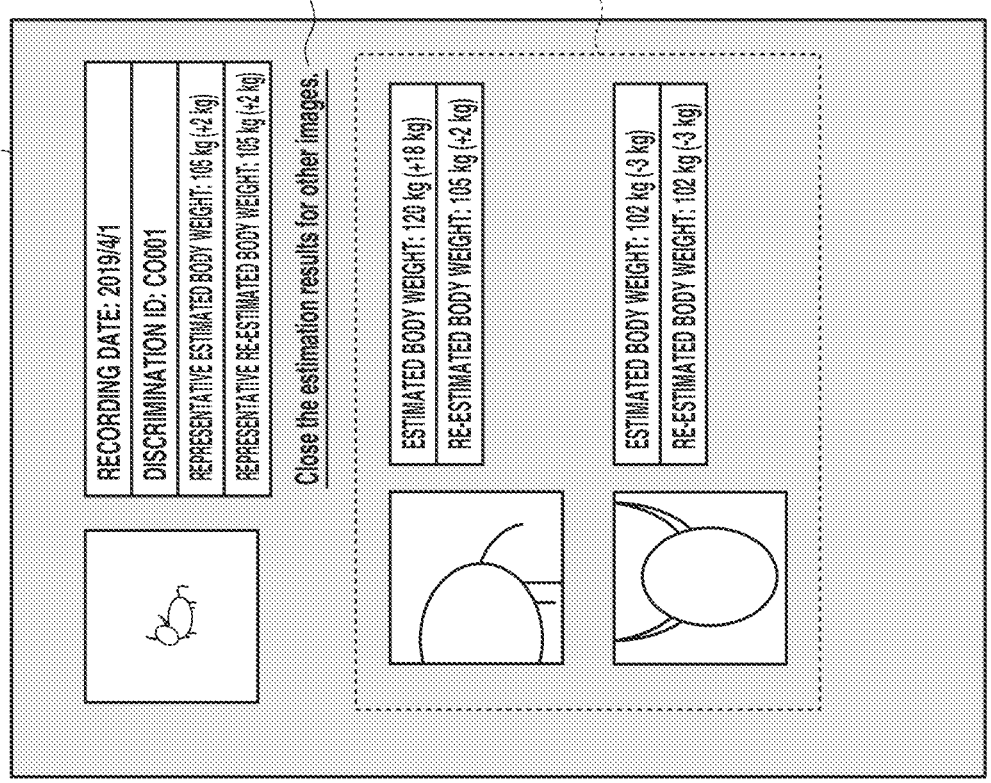
FIGS. 12A and 12B are diagrams illustrating examples of user interfaces each of which is displayed on the client terminal in the third exemplary embodiment.
Figure 12A:
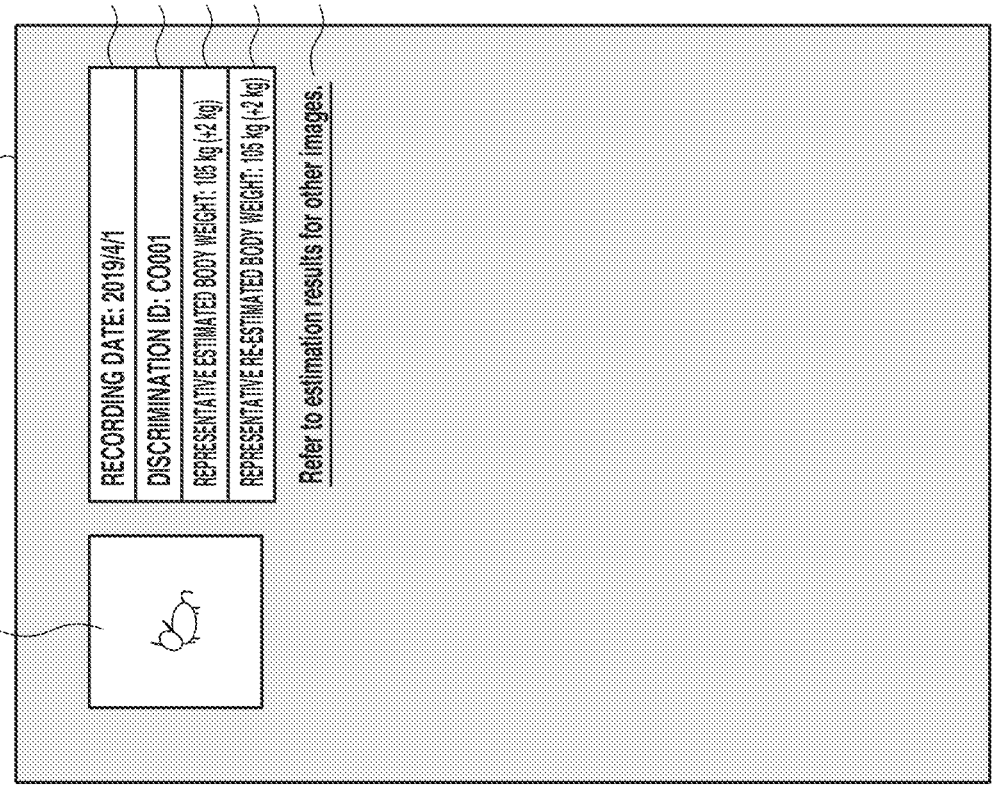

FIGS. 12A and 12B are diagrams illustrating examples of user interfaces each of which is displayed on the client terminal 141 in the body weight estimation system according to the third exemplary embodiment. FIG. 12A is a diagram illustrating an example of a user interface that is displayed on the display unit 238 of the client terminal 141 in step S1112.

An estimation result display screen 1201 is a screen used to display estimated body weight data and re-estimated body weight data for each of all of the discrimination IDs which the client terminal 141 has received in step S1112. In the estimation result display screen 1201, constituent elements 1202 to 1207 are displayed for each of all of the discrimination IDs. In the image data display portion 1202, image data used for estimating a representative estimated body weight in step S1111 is displayed.

In the discrimination ID indication label 1204, the value of a discrimination ID associated with image data used for estimating a representative estimated body weight in step S1111 is indicated. In the recording date indication label 1203, information about the date on which image data used for estimating a representative estimated body weight in step S1111 was registered with the image data management server 113 is indicated. Specifically, the value of the column "registration date" in the image data table is indicated in the recording date indication label 1203.

In the representative estimated body weight indication label 1205, a value determined to have the highest accuracy in step S1111 out of pieces of body weight data estimated by inputting input data extracted from image analysis data to the learning model 402, estimated in step S1104, is indicated.

In the representative re-estimated body weight indication label 1206, a value determined to have the highest accuracy in step S1111 out of pieces of body weight data estimated by inputting input data extracted from image analysis data to the learning model 412, estimated in step S1109, is indicated. When the estimation result reference button 1207 is pressed by the user, other pieces of estimated body weight data and re-estimated body weight data estimated in steps S1104 and S1109 are displayed in the estimation result display screen 1201.

FIG. 12B is a diagram illustrating an example of a screen that is displayed when the estimation result reference button 1207 has been pressed. An other-estimation result display area 1211 is a region in which to display image data, estimated body weight data, and re-estimated body weight data about an estimation result not determined to have the highest accuracy in step S1111. The user of the body weight estimation system refers to the angle of a domesticated animal shown in image data and the accuracy of a body weight estimated from such image data, which are displayed in the other-estimation result display area 1211, thus being able to learn about an angle most appropriate for body weight estimation.

Furthermore, during a period in which the other-estimation result display area 1211 is displayed, the estimation result reference button 1207 is replaced by an estimation result reference cancel button 1212, so that the other-estimation result display area 1211 can be hidden at optional timing desired by the user.

As described above, selecting respective pieces of body weight data estimated from different angle images of the same individual domesticated animal obtainable from video data enables obtaining high-accuracy estimated body weight data without performing image capturing of domesticated animals on an animal-by-animal basis.

Other Embodiments

Embodiment(s) of the present disclosure can also be realized by a computer of a system or apparatus that reads out and executes computer executable instructions (e.g., one or more programs) recorded on a storage medium (that may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-145571 filed Aug. 7, 2019, which is hereby incorporated by reference herein in its entirety.

What is claimed is:

1. A system including an estimation apparatus that performs estimation using a trained model and a client terminal that transmits a request for estimation to the estimation apparatus,
wherein the client terminal comprises:
at least one first processer and at least one first memory coupled to the first processor of the client terminal and having stored thereon instructions, when executed by the first processor of the client terminal, and cooperating to act as:
a presenting unit configured to transmit a request for estimation together with identification information for identifying a domesticated animal targeted for estimation, receive an estimation result, and present body weight data about the domesticated animal targeted for estimation to a user, and
wherein the estimation apparatus comprises:
at least one first processer and at least one first memory coupled to the first processor of the estimation apparatus and having stored thereon instructions, when executed by the first processor of the estimation apparatus, and cooperating to act as:
an acquisition unit configured to acquire data about a domesticated animal identified by identification information that is transmitted by the client terminal; and
an estimation unit configured to perform estimation by inputting the acquired data about a domesticated animal to a trained model generated by performing machine learning based on captured image data of domesticated animals and collected data about domesticated animals and provide, to the client terminal, the estimation result indicating a result of the estimation.

2. The system according to claim 1, wherein the trained model that includes a first trained model generated by performing machine learning based on the image data obtained by performing image capture of domesticated animals and a second trained model generated by performing machine learning based on the image data obtained by performing image capture of domesticated animals and the collected data about domesticated animals, and the acquired data about a domesticated animal is input to the second trained model.

3. The system according to claim 2, wherein, when receiving an estimation request, the estimation unit performs estimation using the first trained model and, when re-receiving an estimation request, the estimation unit performs estimation using the second trained model.

4. The system according to claim 2, wherein the presenting unit receives the estimation result estimated with use of the first trained model and provides body weight data about the domesticated animal targeted for estimation to the user, re-transmits a subsequent estimation request in response to an instruction for re-estimation issued by the user, and receives the estimation result estimated with use of the second trained model and provides body weight data about the domesticated animal targeted for estimation to the user.

5. The system according to claim 2, wherein, when determining that a difference between previous body weight data about a domesticated animal and an estimation result obtained by estimation using the first trained model exceeds a threshold value, the estimation unit performs estimation using the second trained model.

6. The system according to claim 5, wherein the threshold value differs depending on types of domesticated animals targeted for estimation.

7. The system according to claim 1, wherein the image data is obtained by performing image capture with a plurality of cameras set in a rearing farm, and the image data obtained by performing image capture of domesticated animals is also identified by identification information transmitted by the client terminal.

8. The system according to claim 7,
wherein the image data obtained by performing image capturing with a plurality of cameras set in a rearing farm includes a plurality of domesticated animals,
wherein the estimation unit performs estimation with respect to a plurality of domesticated animals, and
wherein the presenting unit provides body weight data about a plurality of domesticated animals to the user.

9. A client terminal included in a system including an estimation apparatus configured to perform estimation by inputting acquired data about a domesticated animal to a trained model generated by performing machine learning based on image data obtained by performing image capturing of domesticated animals and collected data about domesticated animals and the client terminal configured to transmit a request for estimation to the estimation apparatus, the client terminal comprising:

a presenting unit configured to transmit a request for estimation together with identification information for identifying a domesticated animal targeted for estimation, receive an estimation result about a domesticated animal identified by the identification information, and present body weight data about the domesticated animal targeted for estimation to a user.

10. A control method for a system including an estimation apparatus that performs estimation using a trained model and a client terminal that transmits a request for estimation to the estimation apparatus, the control method comprising:

acquiring data about a domesticated animal identified by identification information that the client terminal transmits;

performing estimation by inputting the acquired data about a domesticated animal to a trained model generated by performing machine learning based on image data obtained by performing image capturing of domesticated animals and collected data about domesticated animals and providing an estimation result indicating a result of the estimation; and transmitting a request for estimation together with identification information for identifying a domesticated animal targeted for estimation, receiving the estimation result, and presenting body weight data about the domesticated animal targeted for estimation to a user.

11. A non-transitory computer-readable storage medium storing computer-executable instructions that, when executed by a computer, cause the computer to perform a control method for a system including an estimation apparatus that performs estimation using a trained model and a client terminal that transmits a request for estimation to the estimation apparatus, the control method comprising:

acquiring data about a domesticated animal identified by identification information that the client terminal transmits;

performing estimation by inputting the acquired data about a domesticated animal to a trained model generated by performing machine learning based on image data obtained by performing image capturing of domesticated animals and collected data about domesticated animals and providing an estimation result indicating a result of the estimation; and transmitting a request for estimation together with identification information for identifying a domesticated animal targeted for estimation, receiving the estimation result, and presenting body weight data about the domesticated animal targeted for estimation to a user.

* * * * *